US012518556B2

United States Patent
Go et al.

(10) Patent No.: US 12,518,556 B2
(45) Date of Patent: Jan. 6, 2026

(54) AUGMENTED REALITY DEVICE AND OPERATING METHOD OF THE SAME

(71) Applicant: SAMSUNG ELECTRONICS CO., LTD., Suwon-si (KR)

(72) Inventors: Eunjeong Go, Suwon-si (KR); Taehyuk Kwon, Suwon-si (KR); Seowon Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/763,768

(22) Filed: Jul. 3, 2024

(65) Prior Publication Data
US 2024/0404313 A1 Dec. 5, 2024

Related U.S. Application Data

(63) Continuation of application No. PCT/KR2024/007349, filed on May 29, 2024.

(30) Foreign Application Priority Data

Jun. 2, 2023 (KR) .................. 10-2023-0071852
Nov. 29, 2023 (KR) .................. 10-2023-0170030

(51) Int. Cl.
*G06V 40/10* (2022.01)
*G06F 3/01* (2006.01)
*G06V 10/26* (2022.01)
*G06V 20/20* (2022.01)

(52) U.S. Cl.
CPC .............. *G06V 40/11* (2022.01); *G06F 3/011* (2013.01); *G06V 10/26* (2022.01); *G06V 20/20* (2022.01)

(58) Field of Classification Search
CPC ........ G06V 40/11; G06V 10/26; G06V 20/20; G06V 40/28; G06F 3/011; G06F 3/017
See application file for complete search history.

(56) References Cited

U.S. PATENT DOCUMENTS

| 6,897,854 | B2 | 5/2005 | Cho et al. |
| 10,719,143 | B2 | 7/2020 | Connellan et al. |
| 11,340,716 | B2 | 5/2022 | Marshall et al. |
| 11,409,364 | B2 | 8/2022 | Zhou et al. |
| 11,907,446 | B2 | 2/2024 | Bernstein et al. |
| 2017/0354864 | A1* | 12/2017 | Rogers .................. A63F 13/213 |

(Continued)

FOREIGN PATENT DOCUMENTS

| CN | 107368183 B | 10/2020 |
| CN | 114690900 A | 7/2022 |

(Continued)

OTHER PUBLICATIONS

International Search Report dated Sep. 4, 2024, issued by the International Searching Authority in International Application No. PCT/KR2024/007349.

(Continued)

*Primary Examiner* — Premal R Patel
(74) *Attorney, Agent, or Firm* — Sughrue Mion, PLLC

(57) ABSTRACT

A method for operating an augmented reality (AR) device includes identifying a first object from an image of the first object obtained through a camera, identifying a grip position at which a user grips the first object, and performing an operation based on the grip position.

13 Claims, 13 Drawing Sheets

(56) References Cited

U.S. PATENT DOCUMENTS

| | | | |
|---|---|---|---|
| 2017/0358139 A1* | 12/2017 | Balan | G02B 27/017 |
| 2018/0025248 A1 | 1/2018 | Shan et al. | |
| 2018/0260025 A1 | 9/2018 | Messingher et al. | |
| 2019/0369752 A1 | 12/2019 | Ikeda et al. | |
| 2020/0310561 A1* | 10/2020 | Connellan | G06F 3/03545 |
| 2020/0410222 A1 | 12/2020 | Chang et al. | |
| 2021/0333875 A1* | 10/2021 | Horii | G06T 7/74 |
| 2023/0041294 A1* | 2/2023 | Tokubo | G06F 3/011 |
| 2023/0055819 A1* | 2/2023 | Stumm | G06V 20/20 |
| 2023/0058340 A1 | 2/2023 | Jeong et al. | |
| 2023/0067456 A1 | 3/2023 | Lee et al. | |
| 2025/0155992 A1 | 5/2025 | Zhao et al. | |

FOREIGN PATENT DOCUMENTS

| | | |
|---|---|---|
| CN | 113238649 B | 12/2022 |
| JP | 2017-91336 A | 5/2017 |
| KR | 10-0408518 B1 | 12/2003 |
| KR | 10-2014-0099599 A | 8/2014 |
| KR | 10-2016-0016260 A | 2/2016 |
| KR | 10-2016-0072306 A | 6/2016 |
| KR | 10-2016-0081855 A | 7/2016 |
| KR | 10-2016-0099497 A | 8/2016 |
| KR | 10-2018-0000009 A | 1/2018 |
| KR | 10-2021-0020135 A | 2/2021 |
| KR | 10-2242154 B1 | 4/2021 |
| KR | 10-2021-0117540 A | 9/2021 |
| KR | 10-2316389 B1 | 10/2021 |
| KR | 10-2022-0046906 A | 4/2022 |
| KR | 10-2460737 B1 | 10/2022 |
| KR | 10-2023-0034461 A | 3/2023 |
| KR | 10-2023-0044551 A | 4/2023 |

OTHER PUBLICATIONS

Extended European Search Report issued Sep. 9, 2025 by the European Patent Office for EP Patent Application No. 24815861.0.

* cited by examiner

AUGMENTED REALITY DEVICE AND OPERATING METHOD OF THE SAME

CROSS-REFERENCE TO RELATED APPLICATIONS

The present application is a continuation of international application PCT/KR2024/007349 filed on May 29, 2024 in the Korean intellectual property office and claims benefit of priority to Korean patent applications No. 10-2023-0071852 filed on Jun. 2, 2023 and No. 10-2023-0170030 filed on Nov. 29, 2023 in the Korean intellectual property office. The above applications are hereby incorporated by reference.

BACKGROUND

1. Field

The disclosure relates to an augmented reality (AR) device and an operating method of the same, and more particularly, to a method, performed by an AR device, of identifying an instruction from an image obtained by a camera and operating accordingly, and the AR device.

2. Description of the Related Art

Augmented reality (AR) technology is a technology that synthesizes virtual objects or information with a real environment so as to make the virtual objects or information look like objects existing in the real physical environment. Modern computing and display technologies have enabled the development of systems for AR experiences, in which digitally reproduced images or parts thereof may be presented to users in such a way that they may be thought of as real or recognized as real.

The AR technology may overlay a virtual image on a physical environment space of the real world or a real-world object, so that they can be viewed together. As interest in AR technology increases, development of various technologies for implementing AR has been actively conducted. AR devices (e.g., smart glasses) utilizing the AR technology are being used in daily life for information retrieval, directions, and camera photography, for example.

An AR device is a daily-life device capable of obtaining data from a view point of a user, and particularly, smart glasses or the like may display, through a transparent display, a virtual image overlaid on an image of a physical environment of the real world.

In an AR environment in which a real-world object and a virtual object coexist, various pieces of information about a real-world environment may be provided to a user through an AR image.

SUMMARY

Additional aspects will be set forth in part in the description which follows and, in part, will be apparent from the description, or may be learned by practice of the presented embodiments.

According to an aspect of the disclosure, provided is a method for operating an augmented reality (AR) device including: identifying a first object from the image of the first object obtained through a camera; identifying a grip position at which a user grips the first object; and performing an operation based on the grip position.

The identifying the grip position may include identifying at least one feature point from the image, identifying a hand of the user based on the at least one feature point, and identifying the grip position based on a position of the hand of the user and a position of the first object.

A lengthwise area of the first object may be divided into sections that respectively correspond to different operations of the AR device, and the sections may represent a percentage of area of the lengthwise area of the first object.

The first object may be divided into sections that respectively correspond to different operations of the AR device.

The method may further include providing the user with a virtual image of a guide to operation types respectively corresponding to different grip positions.

The identifying the grip position may include, based on an area at which the user contacts the first object corresponding to a plurality of contact areas, identifying a contact area having a highest priority from among the plurality of contact areas, and identifying the grip position based on the contact area having the highest priority.

The method may further include identifying a rotation of the first object. The performing of the corresponding operation may include performing the corresponding operation based on the identified grip position and the rotation of the first object.

The identifying the rotation of the first object may include identifying a first time point at which the rotation of the first object starts, determining an accumulated amount of movement from the first time point up to a current time point, and determining the rotation based on the accumulated amount of movement.

The first time point may be an earliest time point from among consecutive time points at which an amount of movement during a period of time is equal to or greater than a preset threshold.

The first object may include at least one of a touch sensor or a rotation sensing sensor, and the identifying the rotation of the first object may include obtaining sensing information from the first object via the at least one of the touch sensor or the rotation sensing sensor, and determining the rotation based on the obtained sensing information.

The method may further include displaying a user interface (UI) corresponding to the operation being performed.

According to another aspect of the disclosure, an AR device includes: a camera configured to obtain an image; a display; a memory storing a program including at least one instruction; and at least one processor configured to execute at least one instruction to identify a first object from the image, identify a grip position at which a user grips the first object, and perform an operation based on the grip position.

The at least one processor may be further configured to execute the at least one instruction to identify at least one feature point from the image, identify a hand of the user based on the detected at least one feature point, and identify the grip position based on a position of the hand of the user and a position of the first object.

A lengthwise area of the first object may be divided into sections that respectively correspond to different operations of the AR device, and the sections may represent a percentage of area of the lengthwise area of the first object.

The first object may be divided into sections that respectively correspond to different operations of the AR device.

The at least one processor may be further configured to execute the at least one instruction to provide the user with via a virtual image of a guide comprising a plurality of operations respectively corresponding to different grip positions.

The at least one processor may be further configured to execute the at least one instruction to, based on an area at which the user contacts the first object corresponding to a plurality of contact areas, identify a contact area having a highest priority from among the plurality of contact areas, and identify the grip position based on the contact area having the highest priority.

The at least one processor may be further configured to execute the at least one instruction to identify a rotation of the first object, and perform the corresponding operation based on the grip position and the rotation of the first object.

The at least one processor may be further configured to execute the at least one instruction to identify a first time point at which the rotation of the first object starts, determine an accumulated amount of movement from the first time point up to a current time point, and determine the rotation based on the accumulated amount of movement.

The at least one processor may be further configured to execute the at least one instruction to determine the first time point as an earliest time point from among consecutive time points at which an amount of movement during a period of time is equal to or greater than a preset threshold.

The first object may include at least one of a touch sensor or a rotation sensing sensor, and the at least one processor may be further configured to execute the at least one instruction to obtain sensing information from the first object via the at least one of the touch sensor or the rotation sensing sensor, and determine the rotation based on the obtained sensing information.

According to another aspect of the disclosure, a computer-readable recording medium having recorded thereon a program that is executable by at least one processor of an AR device to perform the method as described as the aspect of the disclosure above.

DETAILED DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
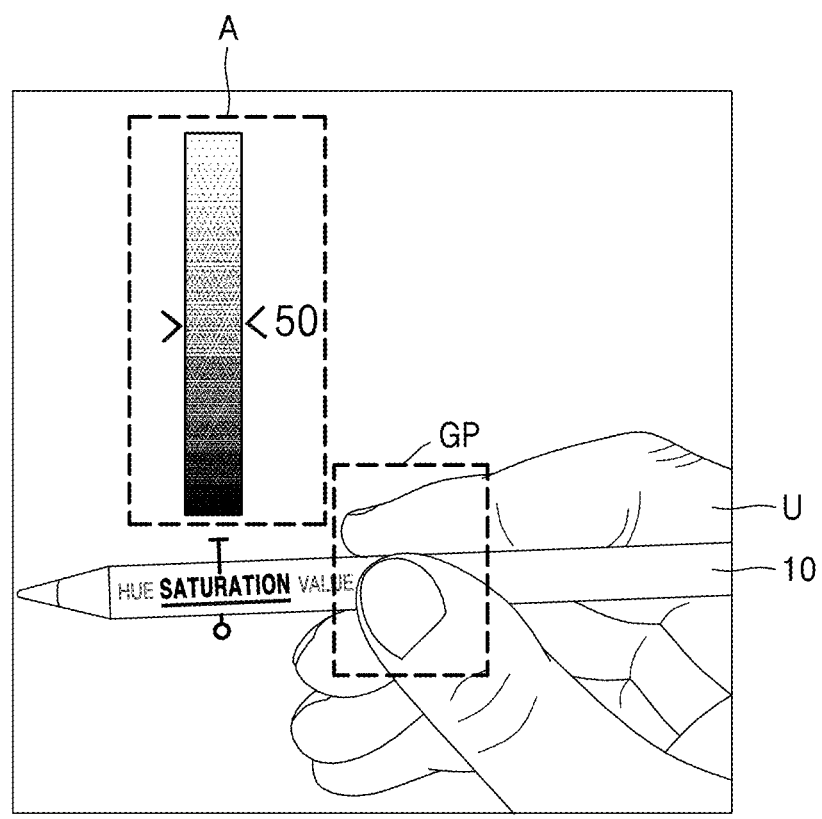
FIG. 1 is a diagram for describing a method by which an augmented reality (AR) device identifies an instruction from an image of a first object obtained through a camera, and operates accordingly according to one or more embodiments.

Hereinafter, one or more embodiments of the disclosure will now be described more fully with reference to the accompanying drawings for one of ordinary skill in the art to be able to perform the embodiment without any difficulty The disclosure may, however, be embodied in many different forms and should not be construed as being limited to the embodiment set forth herein. In the drawings, for a more clear description of the disclosure, parts or units that are not related to the explanation are omitted, and throughout the specification, like reference numerals in the drawings denote like elements.

Although the terms used in embodiments of the disclosure are selected from among common terms that are currently widely used in consideration of their functions in the disclosure, the terms may vary according the intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

As used herein, the singular forms "a," "an," and "the" may include the plural forms as well, unless the context clearly indicates otherwise. Unless otherwise defined, all terms including technical or scientific terms used herein may have the same meanings as commonly understood by one of ordinary skill in the art of the disclosure.

Also, in the disclosure, when a part "includes" or "comprises" an element, unless there is a particular description contrary thereto, the part can further include other elements, not excluding the other elements. Also, the terms such as " . . . unit," "module," or the like used in the disclosure indicate a unit, which processes at least one function or operation, and the unit may be implemented by hardware or software, or by a combination of hardware and software.

Throughout the specification, it will also be understood that when an element is referred to as being "connected to" or "coupled with" another element, it can be directly connected to or coupled with the other element, or it can be electrically connected to or coupled with the other element by having an intervening element interposed therebetween. Also, when a part "includes" or "comprises" an element, unless there is a particular description contrary thereto, the part can further include other elements, not excluding the other elements.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some cases, the expression "system configured to . . . " may mean that the system is "capable of . . ." along with other devices or parts. For example, "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory.

A function related to an artificial intelligence (AI) according to the disclosure operates via a processor and a memory. The processor may refer to one or more processors. In this case, the one or more processors may each be a general-purpose processor such as a central processing unit (CPU), an application processor (AP), a digital signal processor (DSP), or the like, a graphics-dedicated processor such as a graphics processing unit (GPU), a vision processing unit (VPU) or the like, or an AI-dedicated processor such as a neural processing unit (NPU). The one or more processors control input data to be processed according to a predefined operation rule or an AI model which is stored in the memory. When each of the one or more processors is an AI-dedicated processor, the AI-dedicated processor may be designed to have a hardware structure specialized for processing of a particular AI model.

The predefined operation rule or the AI model may be made through training. Herein, when the predefined operation rule or the AI model is made through training, it may mean that a basic AI model (or a deep learning model) is trained by using multiple training data based on a learning algorithm so as to execute desired characteristics (or purpose), thus making the predefined operation rule or AI model. Such training may be performed by a device on which AI according to the disclosure is implemented or by a separate server and/or a system. Examples of the learning algorithm may include, but are not limited to, supervised learning, unsupervised learning, semi-supervised learning, or reinforcement learning.

The AI model (or the deep learning) may include a plurality of neural network layers. Each of the plurality of neural network layers has a plurality of weight values, and performs a neural network operation through an operation between an operation result of a previous layer and a plurality of weight values. The plurality of weight values of the plurality of neural network layers may be optimized due to a training result of the AI model. For example, the plurality of weight values may be updated to reduce or minimize a loss value or a cost value obtained by the AI model during a training process. Examples of the AI neural network may include, but are not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), a Deep Q-Networks (DQN), or the like.

In the present disclosure, an 'augmented reality' indicates that a virtual image is also displayed in a physical environment space of the real-world or a real-world object and a virtual image are co-displayed.

In the present disclosure, an augmented reality (AR) device is a device capable of representing AR, and may display an image including a physical object existing in the real world and a virtual object. The AR device may include AR glasses in the form of eye glasses to be worn by the user on the face, an head mounted display (HMD) or an AR helmet (ARH) to be worn on the head, but embodiments are not limited thereto.

For human-computer interaction, there is a need for a unit to input data into a system. In many cases, a system of a virtual reality, an AR, or a mixed reality does not have a particular input terminal.

As image processing technology using a computer and an image recognition technology develops, various application fields using the image processing technology have been developed. A gesture recognition technology among the various application fields is one of methods of information transfer means, and development in technology therefor is continuously conducted. The gesture recognition technology refers to a technology by which a computer autonomously analyzes and recognizes human behavior, and may include a touch gesture technology and a space gesture technology. In detail, the touch gesture technology refers to a technology for selecting an item by using an input device such as a touch screen, and usage thereof increases with the spread of smart phones. Also, the space gesture technology refers to a technology by which how an operation of a tracking target changes over time is analyzed by using an input device such as a camera, and the change thereof is abstractly interpreted. A key factor of the gesture recognition technology may be to rapidly and correctly identify user's intention.

Recently, a touch screen is used as a default input mechanism of a wide-range of interactive devices such as a smart phone, a tablet personal computer (PC), and an entertainment system. For a human interface device (HID) mobile device, a touch signal may be input to a smart phone, a tablet PC, etc. by using a user's finger, or a touch signal may be input by using a stylus pen that is a type of a digitizer pen enabled for handwriting or drawing. An input through the stylus pen may allow a more detailed input and support a function of detailed drawing, writing, etc., compared to an input using a finger.

According to one or more embodiments of the disclosure, when a user uses an AR device in a wearable form to control another electronic device connected to the AR device, the user can control the connected other electronic device through gesture recognition by manipulating an object the user holds in their hand(s).

According to one or more embodiments, when the user uses the AR device in the wearable form and takes notes (or, draws a painting) on a tablet PC (or, a mobile phone) connected to the AR device by using a stylus pen which the user holds in their hand(s), the user may change (control of the other electronic device) an attribute (a color, a thickness, a type, etc.) of the pen in writing through gesture recognition by rotating the stylus pen the user holds in hand.

According to one or more embodiments, when the user uses the AR device in the wearable form holds the pen in their hand(s) and watches a TV connected to the AR device, the user may change a currently-watched channel of the TV or adjust a volume (control of the other electronic device) through gesture recognition by rotating the pen.

According to one or more embodiments, when the user uses the AR device in the wearable form holds the pen in their hand(s) and uses a computer connected to the AR device, the user may vertically adjust (control of the other electronic device) a scroll of a screen of an application executed via a computer through gesture recognition by rotating the pen the user holds in hand.

In addition to the embodiments described above, according to one or more embodiments of the disclosure, as the user uses the AR device and rotates various objects held by the user, various electronic devices connected to the AR device may be controlled.

Hereinafter, the disclosure will now be described in detail with reference to the accompanying drawings.

FIG. 1 is a diagram for describing a method by which an AR device identifies an instruction from an image of a first object obtained through a camera, and operates accordingly according to one or more embodiments.

The AR device may be a device capable of representing AR, and may include AR glasses in the form of eye glasses to be worn by a user U. Elements of the AR device will be described in detail with reference to FIGS. 8 and 9 to be described below.

According to one or more embodiments, the AR device may obtain an image of the first object 10 through a camera included therein. The first object 10 may be an object the user U of the AR device holds in their hand, and is not limited to an electronic device. According to one or more embodiments, the first object 10 may be an object having a thin and long shape. The first object 10 may be an electronic device such as a digitizer pen, a stylus pen, etc, or an object such as a pencil, a pen, a chopstick, a straw, etc, but is not limited thereto. When the first object 10 is the electronic device, the first object 10 may be connected to the AR device. When the first object 10 is the electronic device, the first object 10 may be connected to the AR device via short-range wireless communication or may be paired with the AR device.

The AR device may identify the image of the first object 10 from an image obtained through the camera. For an operation of identifying the image of the first object 10, an image analysis technology may be used.

The AR device may obtain a real-world scene image through the camera. For example, the camera may be an RGB camera, and the real-world scene image obtained through the camera may be an RGB image. Afterward, the AR device may segment the obtained real-world scene image. The segmentation may indicate an operation of extracting an object in units of pixels from an image. Through the segmentation, an object may be recognized or separated from an image or a video. In the segmentation, each pixel may be allocated a label for the AR device to identify a position, a shape, and which pixel is included in which object in the image.

According to one or more embodiments, the AR device may recognize, through the segmentation, a hand of the user U and an object being held in the hand of the user U from the real-world scene image. Object recognition is a sort of pattern recognition, and may be recognition of an object included in an image or a video by using a trained neural network model.

After the AR device identifies the first object 10 from the image, the AR device may identify a grip position GP at which the user U grips the first object 10. According to one or more embodiments, an operation of identifying the grip position GP may include detecting at least one feature point from the obtained image, identifying a hand of the user U based on the detected at least one feature point, and determining the grip position GP based on a position of the identified hand of the user U and a position of the first object 10.

When the user U holds the first object 10, a contact point between the first object 10 and the user U may be two or more. When the user U holds a pen by using one hand, a thumb and an index finger may contact the pen. When an area at which the user U contacts the first object 10 includes a plurality of contact areas, the identifying of the grip position GP may include identifying a contact area having a highest priority from among the plurality of contact areas, and determining the grip position GP based on the contact area having the highest priority.

According to one or more embodiments, when there are a plurality of the contact points between the first object 10 and the user U, the grip position GP may be determined based on a preset rule. According to one or more embodiments, when the preset rule is that "a contact point at which a right thumb of a user contacts the first object 10 is determined as the grip position GP," the grip position GP may be determined based on the rule.

A case in which the user U grips the first object 10 at a plurality of contact areas will be described in detail with reference to FIG. 3B to be described below.

According to one or more embodiments, the grip position GP may be determined from the position of the first object 10 that is gripped. The position of which the first object 10 is gripped may be determined by what percentage (%) section from the front of the first object 10 (e.g. a pen point of a stylus pen) is gripped in the entire lengthwise area. The entire lengthwise area of the first object 10 may be divided into percentage (%) sections that respectively correspond to different operations of the AR device. For example, when the entire length of the first object 10 is 100%, an area from the pen point (0%) up to 30% may correspond to A-operation, an area of 30% up to 45% may correspond to B-operation, an area of 45% up to 60% may correspond to C-operation, and an area of 60% up to 100% may correspond to D-operation. In this case, when the user U rotates the pen while gripping the pen from the pen point up to a part of 40%, B-operation may be performed.

Referring to FIG. 1, the user U using the AR device in the wearable form may take notes (or, draw a painting) on a tablet PC (or, a mobile phone) connected to the AR device by using a stylus pen (the first object 10) the user U holds. According to one or more embodiments, the grip position GP at which the user U grips the first object 10 that is the stylus pen may be identified to be the part of 40% from the pen point, and the area of 30% up to 45% may correspond to an operation of transmitting an instruction to change saturation of the pen in writing to a connected tablet PC (A-operation). The user U may change saturation of the pen in writing to a desired value, by rotating the stylus pen being held in hand by a certain angle.

According to one or more embodiments, the grip position GP may be determined based on which section from among the preset sections of the first object 10 is gripped. The first object 10 may be divided into preset sections that respectively correspond to different operations of the AR device. According to one or more embodiments, an area from the pen point (i.e. 0 cm) up to 5 cm in the entire length of the first object 10 may correspond to A-operation, an area of 5 cm up to 7 cm may correspond to B-operation, an area of 7 cm up to 9 cm may correspond to C-operation, and an area of 9 cm and thereafter may correspond to D-operation. In this case, when the user U rotates the pen while gripping the pen from the pen point up to a part of 8 cm, C-operation may be performed.

Referring to FIG. 1, the user U worn the AR device in the wearable form may take notes (or, draw a painting) on a tablet PC (or, a mobile phone) connected to the AR device by using a stylus pen (the first object 10) the user U holds. According to one or more embodiments, the grip position GP at which the user U grips the first object 10 that is a stylus pen may be identified as a part of 8 cm from the pen point, and the area of 7 cm up to 9 cm may correspond to an operation (A) of transmitting an instruction to change saturation of the pen in writing to a connected tablet PC. The user U may change saturation of the pen in writing to a desired value, by rotating the stylus pen being held in hand by a certain angle.

According to one or more embodiments, the AR device may provide, as an indicator, the user U with a guide to operation types respectively corresponding to grip positions, through a virtual image. As a guide to which part of the first object 10 corresponds to which operation is provided to the user U, a control of the AR device by the user U may be facilitated. The guide being providable to the user U through the virtual image will be described in detail with reference to FIG. 7 below.

The AR device may identify rotation of the first object 10. According to one or more embodiments, when the AR device may identify rotation of the first object 10 and indicate that a rotation degree (e.g., a rotation angle) with which the user U rotates the first object 10. According to one or more embodiments, the AR device may identify a first time point at which rotation of the first object 10 starts, calculate an accumulated amount of movement from the first time point up to a current time point, and determine rotation (a rotation degree) based on the accumulated amount of movement. According to one or more embodiments, the first time point may be determined as an earliest time point from among consecutive time points at which an amount of movement per time is equal to or greater than a preset threshold. The determined first time point may be a time point at which the user U starts an operation of rotating the first object 10. By determining the first time point, only rotation of the first object 10 related to intention of the user U may correspond to an instruction. An operation in which the AR device identifies rotation (a rotation degree) will be described in detail with reference to FIGS. 4 to 5C below.

According to one or more embodiments, the first object 10 may include a touch sensor as an electronic pen, or a sensor such as a rotation sensing sensor, etc. In this case, the grip position GP or rotation may be sensed and received from the first object 10. According to one or more embodiments, the sensor included in the first object 10 may assist an operation in which at least one of the grip position GP or rotation which is identified by the AR device is verified. According to one or more embodiments, the AR device may verify the grip position GP and rotation which is calculated from an image obtained through a camera, by using sensing data received from the first object 10.

The AR device may perform a corresponding operation based on the identified grip position GP. According to one or more embodiments, the AR device may perform the corresponding operation additionally based on the identified rotation (rotation degree). The AR device may display and provide, to a user, a virtual image of a user interface (UI) (A) corresponding to an operation being performed. The UI displayed as the virtual image may be displayed around the first object 10 or may be displayed to overlap a part of the first object 10.

Referring to FIG. 1, the user U using the AR device in the wearable form may take notes (or, draw a painting) on a tablet PC (or, a mobile phone) connected to the AR device by using a stylus pen (the first object 10) held by the user. According to one or more embodiments, when the AR device performs an operation of transmitting an instruction to change saturation of the pen in writing to the connected tablet PC based on the identified grip position GP (or, additionally identified rotation), the AR device may display and provide, to a user, a virtual image of a UI (A) corresponding to the operation.

According to one or more embodiments, the AR device may display a virtual image of an indicator indicating a spectrum image of saturation around the first object 10 and current saturation based on the grip position GP, and may display a virtual image of an indicator indicating saturation to be changed based on a rotation degree of the first object 10. According to one or more embodiments, when the current saturation has a value of 50, the AR device may decrease a saturation value with respect to an operation in which the user U rotates the first object 10 in a clockwise direction according to a rotation degree (rotation angle), and may increase the saturation value with respect to an operation in which the user U rotates the first object 10 in a counterclockwise direction according to a rotation degree (rotation angle).

An operation in which the AR device performs a corresponding operation, based on the identified grip position GP (or, the additionally identified rotation) will be described in detail with reference to FIG. 6 below.

Figure 2A:
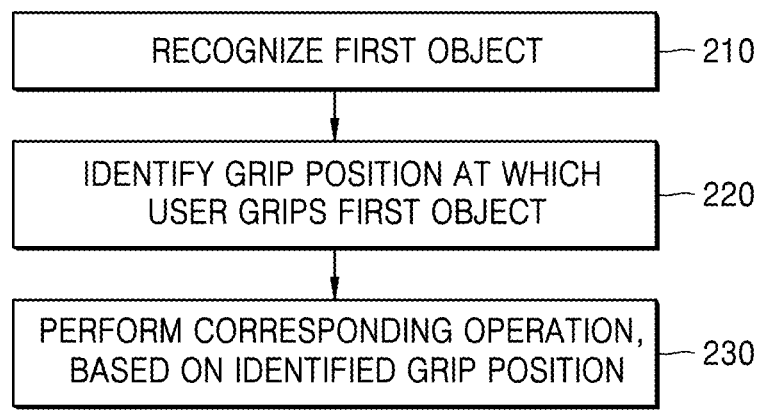
FIG. 2A is a flowchart of a method by which an AR device operates according to one or more embodiments.
Figure 2B:
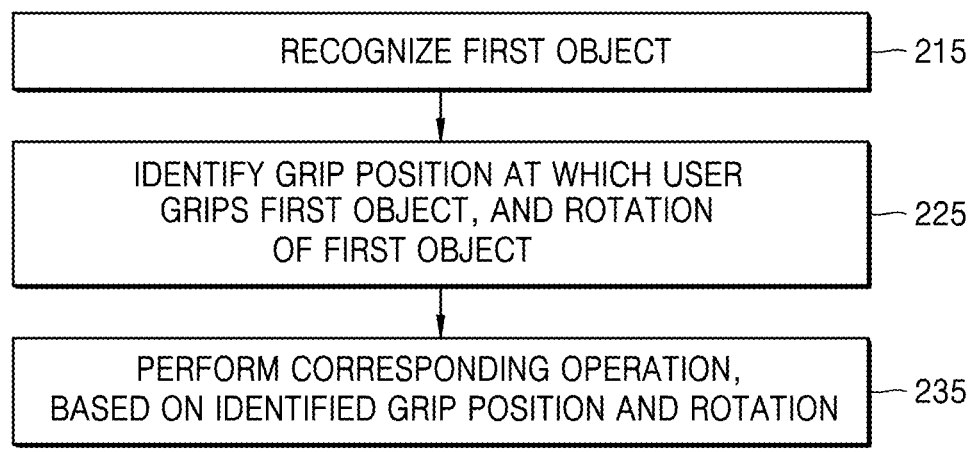
FIG. 2B is a flowchart of a method by which an AR device operates according to one or more embodiments.

FIGS. 2A and 2B are flowcharts of a method by which the AR device operates according to one or more embodiments.

FIG. 2A illustrates an embodiment in which the AR device operates based on a grip position at which a user grips a first object, and FIG. 2B illustrates an embodiment in which the AR device operates based on the grip position at which the user grips the first object, and a rotation degree of rotation of the first object.

In operation 210 of FIG. 2A and operation 215 of FIG. 2B, the AR device recognizes the first object. The AR device may identify the first object from an image obtained through a camera. The first object may be an object a user of the AR device holds in their hand, and may be the object having a thin and long shape. Image analyzing technology may be used for an operation identifying the image of the first object obtained by the AR device through the camera.

According to one or more embodiments, the AR device may recognize the hand of the user and the object the user holds in the hand from a real-world scene image through a segmentation operation. Object recognition may be done by using pattern recognition, and may be recognition of an object included in an image or a video by using a trained neural network model.

In operation 220 of FIG. 2A, the AR device may identify a grip position at which the user grips the first object. Referring to operation 225 of FIG. 2B, the AR device may identify the grip position at which the user grips the first object, and may additionally identify the rotation of the first object. The rotation of the first object may correspond to a rotation degree or a rotation angle caused when the user rotates the first object.

According to one or more embodiments, the AR device may detect at least one feature point from the image obtained through the camera, may identify the hand of the user based on the detected at least one feature point, and may determine the grip position based on a position of the hand of the user and a position of the first object. According to one or more embodiments, the AR device may separate an image corresponding to the hand of the user and an image of the object the user holds in the hand from the image obtained through the camera. The AR device may further determine the grip position at which the user grips the object based on relative positions on a real-world scene image of the image corresponding to the hand of the user and the image of the object the user holds in the hand.

According to one or more embodiments, the entire lengthwise area of the first object 10 may be divided into percentage (%) sections that respectively correspond to different operations of the AR device. According to one or more embodiments, the grip position may be determined by the position of the grip of the user's hand on a percentage section from the front of the first object 10 in the entire lengthwise area of the first object 10.

According to one or more embodiments, the first object 10 may be divided into preset sections that respectively correspond to different operations of the AR device. The grip position may be determined from a section among the preset sections on the first object 10.

According to one or more embodiments, when an area at which the user contacts the first object corresponds to a plurality of contact areas, the AR device may identify a contact area having a highest priority from among the plurality of contact areas at which the user and the first object contact, and may determine the grip position based on the contact area having the highest priority. Alternatively, when an area at which the user contacts the first object corresponds to a plurality of contact areas, the grip position may be determined based on a preset rule.

According to one or more embodiments, the AR device may provide, as an indicator, the user with a guide to operation types respectively corresponding to grip positions through a virtual image.

According to one or more embodiments, the AR device may further identify a rotation of the first object. The AR device may perform a corresponding operation based on the identified grip position and the identified rotation.

According to one or more embodiments, the AR device may identify a first time point at which rotation of the first object starts, may calculate an accumulated amount of movement from the first time point up to a current time point, and may determine a rotation degree or a rotation angle based on the accumulated amount of movement. Here, the first time point may be determined as an earliest time point from among consecutive time points at which an amount of movement per time is equal to or greater than a preset threshold. The first time point may be a time point at which the user starts an operation of rotating the first object, and by determining the first time point, only the rotation of the first object related to intention of the user may correspond to an instruction.

According to one or more embodiments, the first object may include a touch sensor as an electronic device, and the AR device may obtain sensing information from the first object via the touch sensor. The AR device may determine at least one of the grip position or the rotation degree (rotation angle) based on the obtained sensing information via the touch sensor of the first object.

According to one or more embodiments, the first object may include a rotation sensing sensor as an electronic device, and the AR device may obtain the sensing information from the first object via the rotation sensing sensor. The AR device may determine the rotation degree (rotation angle) based on the obtained sensing information via the rotation sensing sensor of the first object.

According to one or more embodiments, a sensor included in the first object may assist an operation in which at least one of the grip position or rotation identified by the AR device is verified. According to one or more embodiments, the AR device may verify the grip position and the rotation degree (rotation angle) which are calculated from the image obtained through the camera by using sensing data received from the first object.

In operation 230 of FIG. 2A, the AR device performs a corresponding operation based on the identified grip position. Referring to operation 235 of FIG. 2B, the AR device may perform the corresponding operation based on the identified grip position of the first object and identified rotation (the rotation degree or the rotation angle). According to one or more embodiments, the AR device may display a virtual image of a UI corresponding to an operation being performed. The UI displayed as the virtual image may be displayed around the first object or may be displayed to overlap a part of the first object.

Figure 3A:
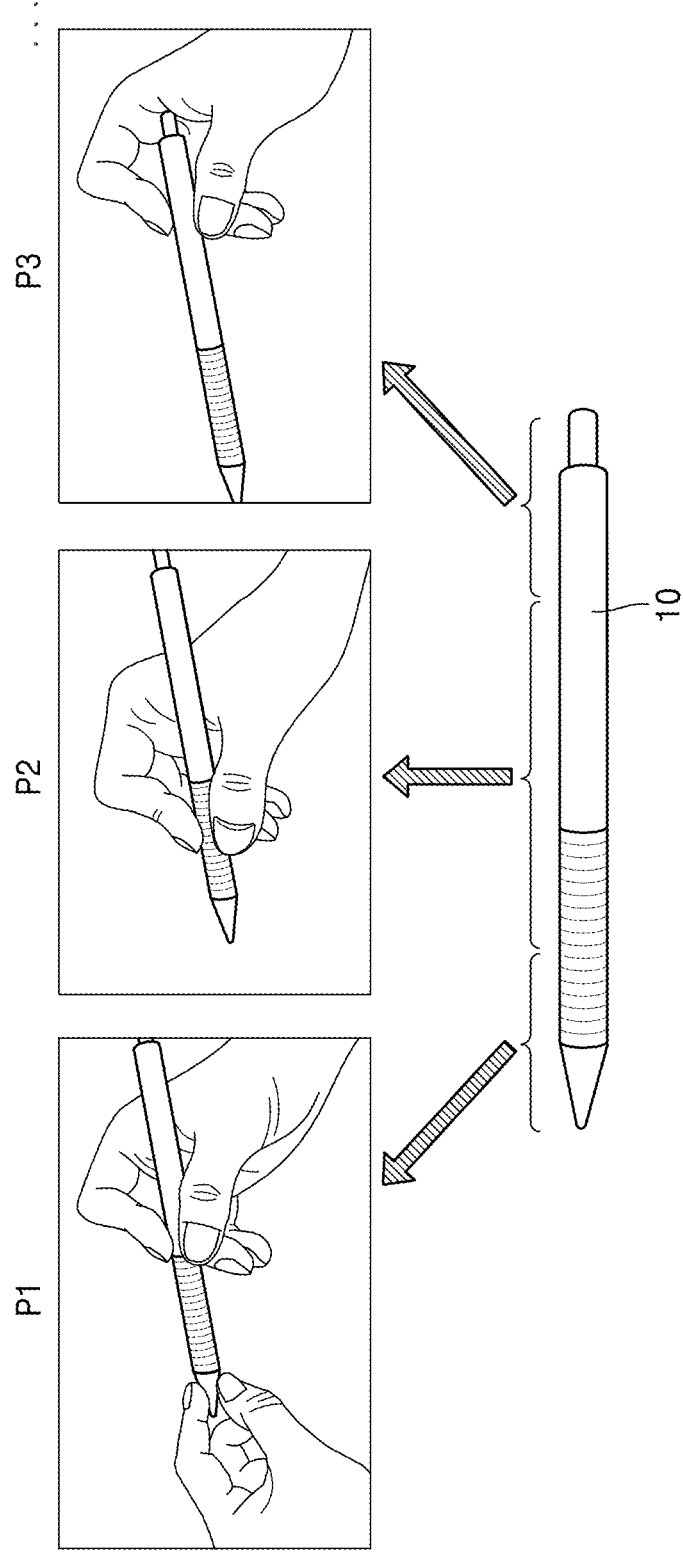
FIG. 3A is a diagram for describing an operation in which an instruction is identified according to a grip position of a first object according to one or more embodiments.

FIG. 3A is a diagram for describing an operation in which an instruction is identified according to a grip position of the first object 10 according to one or more embodiments.

The AR device may identify the first object 10 from an image and then may identify a grip position at which a user grips the first object 10. The grip position may indicate which part of an area of the first object 10 the user holds.

According to one or more embodiments, candidate values for grip positions may be preset to be a particular number. The number of sections with which grip positions are identified or which instruction corresponds to which grip position may be set by the user.

Referring to FIG. 3A, candidate values for grip positions (i.e., the number of sections with which grip positions are identified) may be set to 3. According to one or more embodiments, the grip positions may be identified as a first section P1, a second section P2, or a third section P3. Different instructions may respectively correspond to an operation in which the user holds the first section P1 of the first object 10 and rotates the first object 10, an operation in which the user holds the second section P2 of the first object 10 and rotates the first object 10, and an operation in which the user holds the third section P3 of the first object 10 and rotates the first object 10.

According to one or more embodiments, when the user uses the AR device in the wearable form and takes notes (or, draws a painting) on a tablet PC (or, a mobile phone) connected to the AR device by using a stylus pen (the first object 10) the user holds in hand, an operation of rotating the first object 10 while gripping the first section P1 may correspond to an operation of changing a type (e.g., a ball pen, a fountain pen, a colored pen, a highlighter, a brush pen, etc.) of the pen in writing, an operation of rotating the first object 10 while gripping the second section P2 may correspond to an operation of changing a color of the pen in writing, and an operation of rotating the first object 10 while gripping the third section P3 may correspond to an operation of changing a thickness of the pen in writing.

According to one or more embodiments, the grip position may be determined by a percentage (%) section from the front of the first object 10 (e.g. a pen point of a stylus pen) that is gripped in the lengthwise area of the first object 10. The lengthwise area of the first object 10 may be divided into percentage (%) sections that respectively correspond to different operations of the AR device. According to one or more embodiments, when the length of the first object 10 is 100%, an area from the pen point (0%) up to 20% may correspond to the first section P1, an area of 20% up to 70% may correspond to the second section P2, and an area of 70% up to 100% may correspond to the third section P3. A different operation of the AR device may correspond to an operation in which the user rotates the pen while gripping the first section P1, the second section P2, or the third section P3.

According to one or more embodiments, the first section P1, the second section P2, and the third section P3 may be identified according to preset length sections. According to one or more embodiments, an area from the pen point (0 cm) up to 3 cm in the length of the first object 10 may correspond to the first section P1, an area of 3 cm up to 9 cm may correspond to the second section P2, and an area of 9 cm and thereafter may correspond to the third section P3. A different operation of the AR device may correspond to an operation in which the user rotates the pen while gripping the first section P1, the second section P2, or the third section P3.

According to one or more embodiments, the AR device may provide, as an indicator, the user with a guide to the preset sections through a virtual image. It may be difficult for the user to identify a boundary between two adjacent sections. For example, the user may not identify which position on the first object 10 is the first section P1, and may incorrectly grip a particular position in the second section P2 although the user intends to grip the first section P1. In this case, as the user grips an incorrect position although the user intends a first operation (such as a change in a type of a pen in writing), a second operation (such as a change in a color of the pen in writing) may be performed.

In order to prevent a grip position error, the AR device may provide the user with a guide to respective distinguished sections. According to one or more embodiments, the AR device may provide a virtual image of a marking line marking a boundary between the first section P1 and the second section P2 and a boundary between the second section P2 and the third section P3, or may respectively display the first section P1, the second section P2, and the third section P3 with different colors or hatches. As the guide that distinguishes between different areas on the first object 10 is provided as the virtual image to the user, the user may be guided to grip a correct position.

According to one or more embodiments, candidate values for grip positions, (the number of sections with which the grip positions are distinguished) may be set to n, n being a whole number and may be set to a value of 1 through infinity (n=1, 2, 3, . . . ). Although a maximum number of sections with which the grip positions are distinguished is not limited, in order for the AR device to correctly identify a grip position from an image obtained through a camera, the number of sections may be about 6 or less so that there are not too many sections.

Figure 3B:
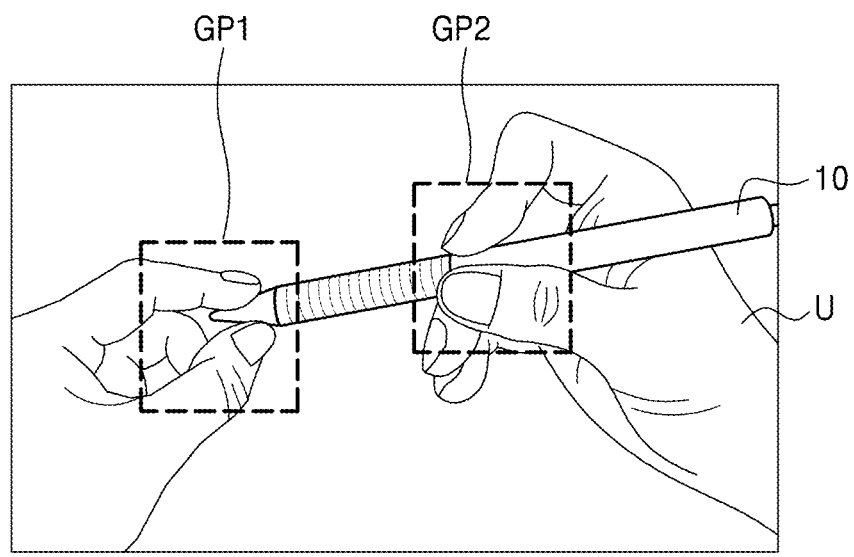
FIG. 3B is a diagram for describing an operation in which a corresponding instruction is identified when there are a plurality of grip positions of a first object according one or more embodiments.

FIG. 3B is a diagram for describing an operation in which a corresponding instruction is identified when there are a plurality of grip positions (GP1, GP2) of the first object 10 according to one or more embodiments.

When a user U holds the first object 10, a contact point between the first object 10 and the user U may be two or more. According to one or more embodiments, when the user U holds a pen by using one hand, a thumb and an index finger may contact the pen. Alternatively, when the user U holds the pen by using two hands, thumbs and index fingers of both hands may contact the pen.

According to one or more embodiments, when an area at which the user U contacts the first object 10 corresponds to a plurality of contact areas, the identifying of the grip position may include identifying a contact area having a highest priority from among the plurality of contact areas and determining the grip position based on the contact area having the highest priority.

According to one or more embodiments, a priority order of the contact areas may be determined according to fingers corresponding to the contact areas. According to one or more embodiments, when the user U is right handed, a contact area of a thumb of a right hand may have a highest priority. In this embodiment, the AR device may determine, as a grip position, an area GP2 at which the thumb of the right hand of the user U contacts the first object 10.

According to one or more embodiments, a priority order of the contact areas may be determined according to distances from a pen point. According to one or more embodiments, the AR device may determine, as a grip position, a contact point that is closest to the pen point from among the plurality of contact points at which the user U contacts the first object 10.

According to one or more embodiments, a grip position may be determined as a pair of multiple contact points. According to one or more embodiments, one contact point having a highest priority according to a priority order of the plurality of contact points may be determined as a grip position or a set of multiple contact points may be determined as a grip position.

According to one or more embodiments, in an operation in which the user U holds and rotates the first object 10 with two hands, a grip position may be determined as a pair of contact points at which thumbs of two hands of the user U contact the first object 10. The operation in which the user U holds and rotates the first object 10 with two hands may be matched with an instruction different from an operation of rotating the first object 10 by using one hand. According to one or more embodiments, when a position on the first object 10 is divided into a first section and a second section, a case where a grip position is one first section, a case where a grip position is one second section, and a case where a grip position is a pair of the first section and the second section may correspond to different instructions, respectively.

According to one or more embodiments, when a user uses the AR device in the wearable form holds a ball pen in hand and watches a TV connected to the AR device, the user may change a currently-watched channel of the TV by holding a first section on the ball pen and rotating the ball pen, may adjust a volume of the currently-watched TV by holding a second section on the ball pen and rotating the ball pen, and may change an input source of the TV by respectively holding the first section and the second section with two hands and rotating the ball pen.

According to one or more embodiments, a case in which the user U holds the first object 10 with two hands may be divided into three cases.

According to one or more embodiments, a first case may be a case in which the user U supports the first object 10 with a left hand and rotates the first object 10 by using only a right hand.

According to one or more embodiments, a second case may be a case in which the user U supports the first object 10 with a right hand and rotates the first object 10 by using only a left hand.

According to one or more embodiments, a third case may be a case in which the user rotates the first object 10 with two hands.

The three cases above may be identified based on a change in a position on an image of a thumb of the user U. According to one or more embodiments, a first case may be, when a thumb and index finger of a left hand of the user U do not have a positional change, and positions of a thumb and index finger of a right hand of the user U are moved in a clockwise direction with respect to the first object 10, the AR device may identify that the user U rotates the first object 10 by using the right hand. Alternatively, when the thumb of the right hand and the thumb of the left hand of the user U perform rotation movement with respect to the first object 10, the AR device may identify that the user U rotates the first object 10 by using two hands.

A grip position may be determined according to which hand rotates the first object 10. That is, when it is determined that the user U supports the first object 10 with a left hand and rotates the first object 10 by using only a right hand, an area GP2 at which the right hand contacts the first object 10 may be determined as the grip position. That is, when it is determined that the user U supports the first object 10 with the right hand and rotates the first object 10 by using only the left hand, an area GP1 at which the left hand contacts the first object 10 may be determined as the grip position. When the user U rotates the first object 10 with two hands, the area GP2 at which the right hand contacts the first object 10 and the area GP1 at which the left hand contacts the first object 10 may be all of the grip positions.

In this manner, a grip position that is one contact point from among the plurality of contact points at which the user U contacts the first object 10 may be determined or a grip position that is a set of multiple contact points may be determined. A grip position may vary according to a contact point on the first object 10 and the number of contact points contacting the first object 10. Different instructions may correspond to different grip positions.

Figure 4:
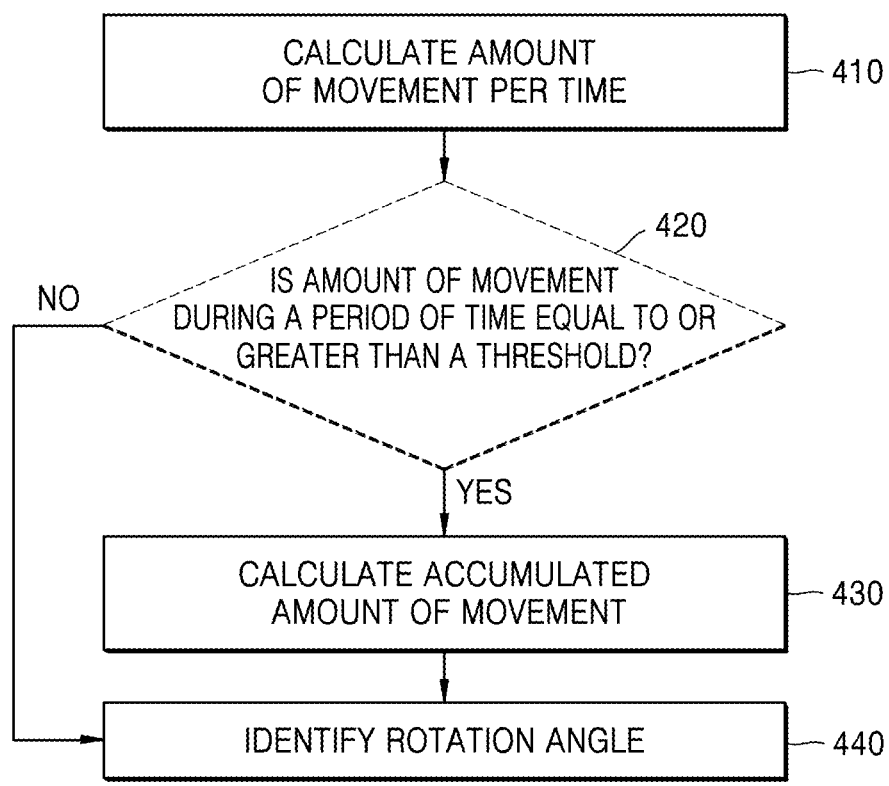
FIG. 4 is a flowchart of an operation of identifying rotation of a first object according to one or more embodiments.

FIG. 4 is a flowchart of an operation of identifying rotation of a first object according to one or more embodiments.

The AR device may identify rotation of the first object. The AR device may identify rotation of the first object and may identify a rotation degree or a rotation angle caused when the user rotates the first object.

In operation 410, the AR device may calculate an amount of movement during a duration of time. The amount of movement during a duration of time may be calculated based on an image obtained by the AR device through a camera. The AR device may capture a real-world scene image at regular time intervals.

According to one or more embodiments, a frame may indicate a piece of a still image obtained through the camera. When consecutive scenes of the first object are photographed, a next frame may indicate image data obtained after one period (dt) from a current image, and a previous frame may indicate image data obtained before one period (dt) from the current image.

The AR device may respectively extract feature points from a first image obtained at a particular time point t and a second image obtained at a time point (t+dt) which is a next frame. According to one or more embodiments, a feature point may include an end point of a hand of a user, a boundary point of a nail, or a feature point according to a shape, a form, etc. of the first object. The AR device may match a feature point included in the first image with a feature point included in the second image. The matching of the feature points may indicate that same feature points are matched with each other. The AR device may compare a feature point of the first image with a feature of the second image which corresponds to the feature point of the first image, and thus may calculate an amount of movement during a duration of time. The duration of time is represented by Equation 1.

$$\Theta t = (dx, dy)/dt \qquad \text{[Equation 1]}$$

Accordingly, $\Theta_t$ represents an amount of movement of the first object during a duration of time, dx represents a change in the feature point from the first image to the second image in a horizontal direction of the first object, dy represents a change in the feature point from the first image to the second image in a vertical direction of the first object, and dt represents a duration of time between when the first image was obtained and the second image was obtained.

In operation 420, the AR device may determine whether an amount of movement of the first object during a duration of time at a particular time point is equal to or greater than a threshold $\Theta_{th}$. The threshold $\Theta_{th}$ may indicate a minimum amount of movement to be determined as a rotation operation. When the user holds the first object, a small rotation that is not intended by the user may occur. In order to determine a rotation movement that is not intended by the user as a noise, a threshold for determining occurrence of a rotation operation may be set.

According to one or more embodiments, the AR device may determine a first time point as an earliest time point from among consecutive time points at which an amount of movement per time is equal to or greater than a preset threshold. The first time point may correspond to a time point at which rotation of the first object starts. That is, the first time point may be a time point at which the user starts an operation of rotating the first object. By determining the first time point, only rotation of the first object related to intention of the user may correspond to an instruction.

In operation 430, the AR device may calculate an accumulated amount of movement $\Theta$ from a first time point t1 up to a current time point t. The accumulated amount of movement $\Theta$ may be calculated by using Equation 2.

$$\Theta = \sum_{t1}^{t} \Theta_t \qquad \text{[Equation 2]}$$

In operation 440, the AR device may determine a rotation degree or a rotation angle of the first object based on the accumulated amount of movement of the first object. Afterward, the AR device may be controlled based on a value of the rotation degree or rotation angle.

According to one or more embodiments, when the user uses the AR device in the wearable form and holds a ball pen in their hand and watches a TV connected to the AR device, the user may change a currently-watched channel of the TV through gesture recognition by rotating the ball pen. Here, whenever the user rotates the ball pen by a preset angle, a TV channel may increase or decrease by 1. According to one or more embodiments, in a case where it is set that the TV channel increases or decreases by 1 at every rotation of the ball pen by 10°, when the user rotates the ball pen by 10° in a clockwise direction, a channel may increase by 1, and when the user rotates the ball pen by 10° in a counterclockwise direction, the channel may decrease by 1.

Figure 5A:
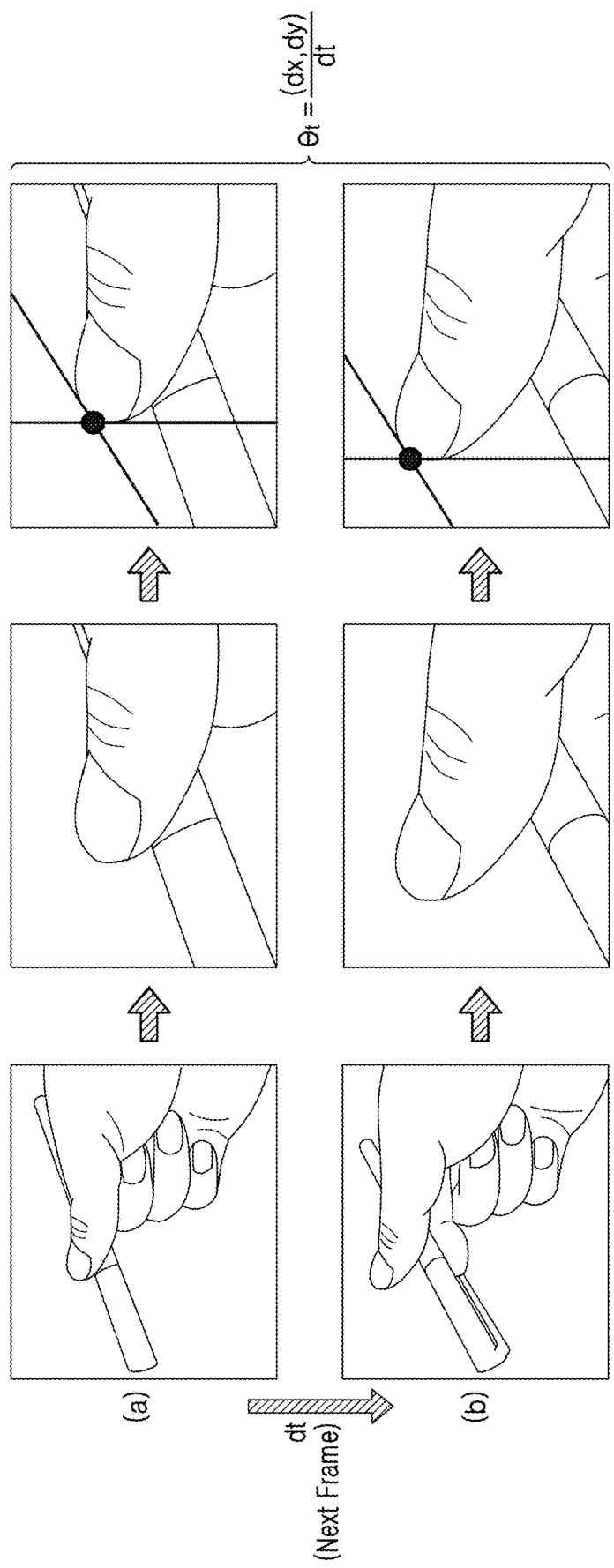
FIG. 5A is a diagram for describing an operation of identifying rotation of a first object based on a hand image of a user according to one or more embodiments.
Figure 5B:
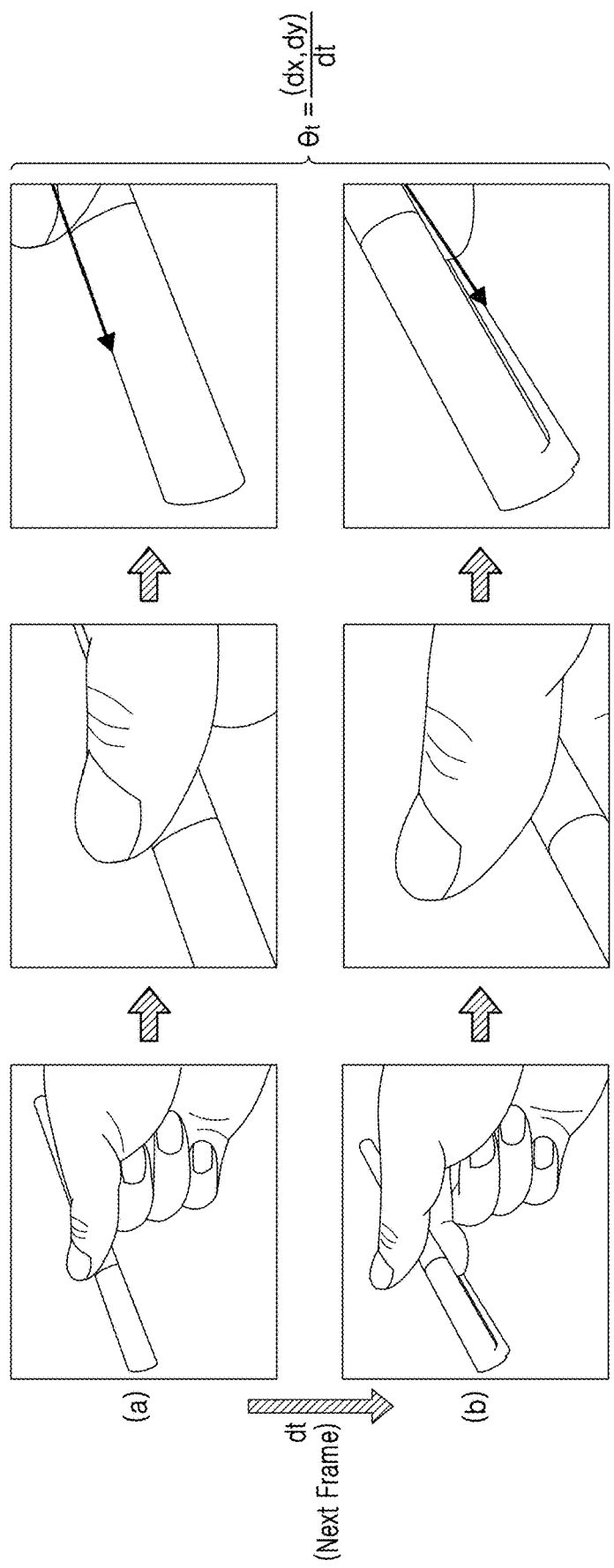
FIG. 5B is a diagram for describing an operation of identifying rotation of a first object based on an angle of the first object according to one or more embodiments.

FIG. 5A is a diagram for describing an operation of identifying rotation of a first object based on a hand image of a user according to one or more embodiments, and FIG. 5B is a diagram for describing an operation of identifying rotation of a first object based on an angle of the first object according to one or more embodiments.

Referring to FIGS. 5A and 5B, the AR device may obtain a first image at a particular time point t1 (a), and may obtain a second image at a later time point t1+dt, dt being the amount of time after time point t1 (b). The AR device may extract feature points from the first image and the second image, respectively.

Referring to FIG. 5A, the feature point may be related to a hand of a user, such as an end point of the hand of the user, a boundary point of a nail, or the like. Referring to FIG. 5B, the feature point may include a feature point according to a shape, a form, etc. of the first object (e.g., a ball pen).

The AR device may match a feature point included in the first image with a feature point included in the second image. The matching of the feature points may indicate that same feature points are matched with each other.

Referring to FIG. 5A, the AR device may compare a position of a tip of a thumb of the user in the first image with a position of a tip of a thumb of the user in the second image, and thus, may calculate an amount of movement during a duration of time (see Equation 1).

Referring to FIG. 5B, the AR device may compare an angle of the first object in the first image with an angle of the first object in the second image, and thus, may calculate an amount of movement during a duration of time (see Equation 1).

Figure 5C:
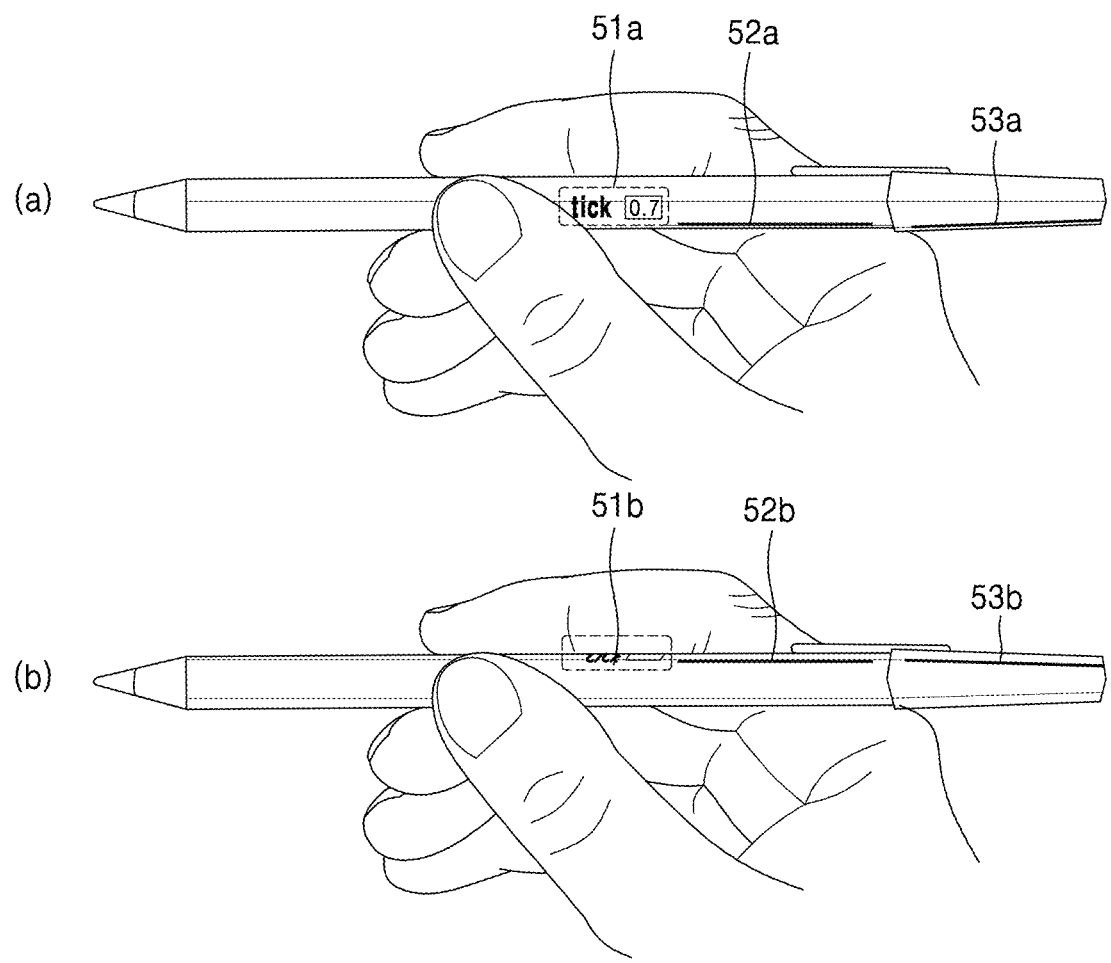
FIG. 5C is a diagram for describing an operation of identifying rotation of a first object based on a feature of the first object according to one or more embodiments.

FIG. 5C is a diagram for describing an operation of identifying rotation of a first object based on a feature of the first object according to one or more embodiments.

Referring to FIG. 5C, the AR device may obtain a first image at a particular time point t1 (a), and may obtain a second image at a time point t1+dt, dt being the amount of time after time point t1 (b). The AR device may extract feature points from the first image and the second image, respectively.

Referring to FIG. 5C, the feature point may include a feature point according to a shape, a form, etc. of the first object (e.g., a ball pen). According to one or more embodiments, when there is a part of a text stamped or printed on a side surface of the first object (51a, 51b), the corresponding part may be the feature point. According to one or more embodiments, when the first object has an angular shape, edge parts 52a, 52b, 53a, and 53b due to the angular shape may each be the feature point.

The AR device may match the feature point included in the first image with the feature point included in the second image. The matching of the feature points may indicate that same feature points are matched with each other. Referring to FIG. 5C, the stamped or printed text 51a of the first image may be matched with the stamped or printed text 51b of the second image, and the edge parts 52a and 53a of the first image may be matched with the corresponding edge parts 52b and 53b of the second image.

The AR device may compare a position of the feature point in the first image with a position of the feature point in the second image, and thus, may calculate an amount of movement during a duration of time (see Equation 1).

According to one or more embodiments, a method of calculating an amount of movement during a duration of time at a particular time point is not limited to an embodiment shown in FIGS. 5A to 5C, and an amount of movement during a duration of time at a particular time point may be calculated based on a change in various feature points or a change in various attributes obtainable through a camera.

The AR device may determine whether an amount of movement per time at a particular time point is equal to or greater than a threshold $\Theta_{th}$. The threshold $\Theta_{th}$ may indicate a minimum amount of movement to be determined as a rotation operation. When the user holds the first object, a small rotation of the first object that is not intended by the user may occur. In order to determine a rotation movement that is not intended by the user as a noise, a threshold for determining occurrence of a rotation operation may be set.

According to one or more embodiments, the AR device may determine a first time point as an earliest time point from among consecutive time points at which an amount of movement during a duration of time is equal to or greater than a preset threshold. The first time point may correspond to a time point at which rotation of the first object starts. That is, the determined first time point may be a time point at which the user starts an operation of rotating the first object. By determining the first time point, only rotation of the first object related to intention of the user may correspond to an instruction.

Afterward, the AR device may calculate an accumulated amount of movement $\Theta$ from a first time point t1 up to a current time point t, and may determine a rotation degree or a rotation angle of the first object based on the accumulated amount of movement of the first object. Afterward, the AR device may be controlled based on a value of the rotation degree or rotation angle.

Figure 6:
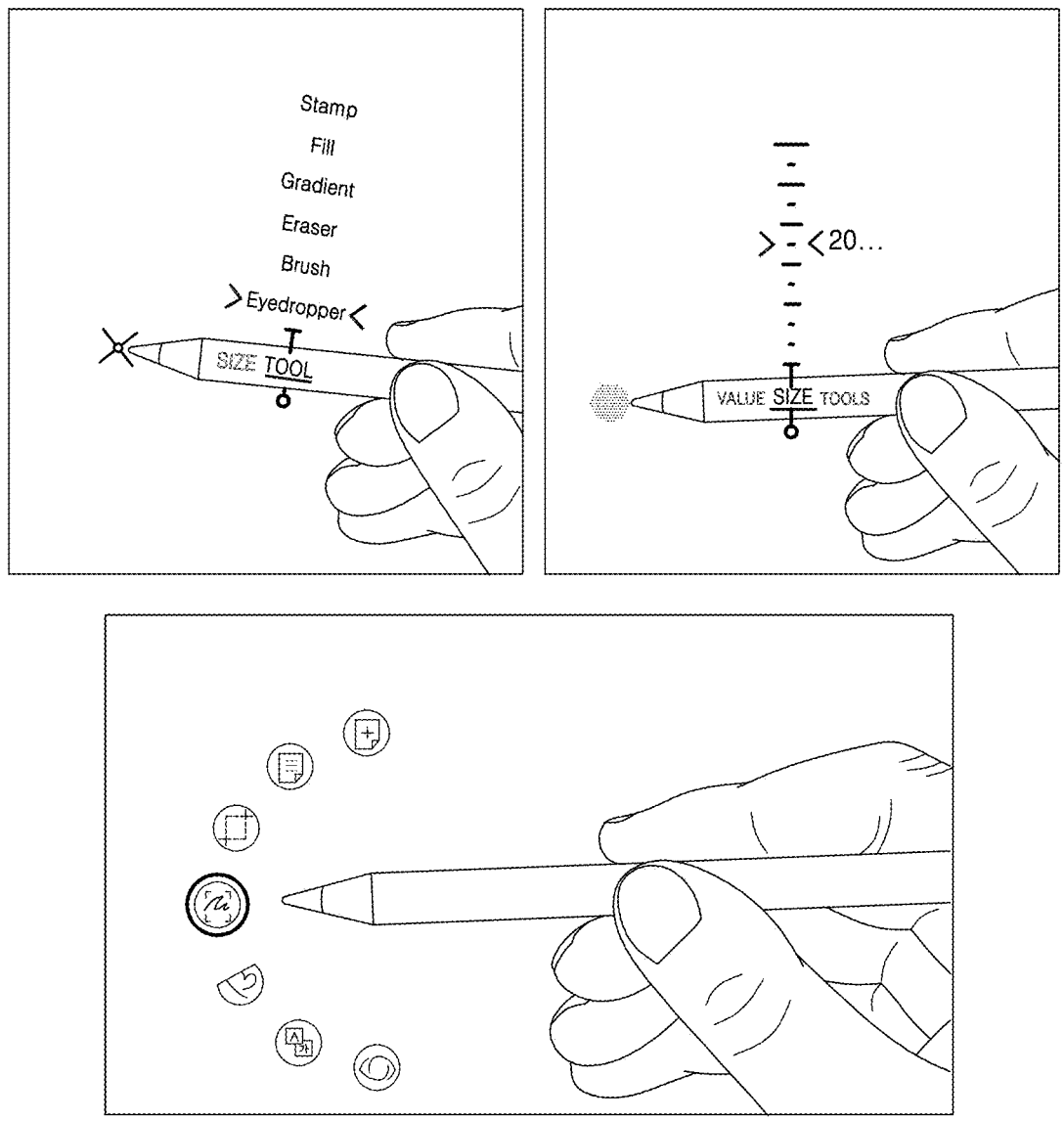
FIG. 6 is a diagram illustrating an operation in which an AR device performs an operation according to one or more embodiments.

FIG. 6 is a diagram of an operation in which the AR device performs an operation according to one or more embodiments.

According to one or more embodiments, the user using the AR device in the wearable form may control other electronic device (second object) connected the AR device, through gesture recognition by manipulating an object (first object) held in hand.

According to one or more embodiments, when the user using the AR device in the wearable form takes notes (or, draws a painting) on a tablet PC (or, a mobile phone) connected to the AR device by using a stylus pen the user holds in hand, the user may change (control of the other electronic device) an attribute (a color, a thickness, a type, etc.) of the pen in writing through gesture recognition by rotating the stylus pen.

Referring to FIG. 6, the user may change a type or thickness of the pen in writing by rotating the stylus pen the user holds in hand. According to one or more embodiments, the user may perform switching of a screen of an application executed in the other electronic device (second object) connected to the AR device, by rotating the stylus pen the user holds in hand.

According to one or more embodiments, when the user using the AR device in the wearable form holds the pen in hand and watches a TV connected to the AR device, the user may change a currently-watched channel of the TV or adjust a volume (control of the other electronic device) through gesture recognition by rotating the pen.

According to one or more embodiments, the AR device may display an AR image including a UI corresponding to an operation being performed. The AR device may perform an operation of controlling another connected electronic device (second object), in response to a user rotating the first object.

The AR device may determine an area on which an AR image is to be displayed based on a position of a first object image in a real-world scene image. According to one or more embodiments, the AR device may display a virtual image including a UI around the first object in consideration of a position of the first object in the obtained real-world scene image.

According to one or more embodiments, an AR image including an UI may be displayed near the first object or may be displayed to overlap at least a part of the first object image.

However, the AR image including the UI may not be displayed around the image of the first object. According to one or more embodiments, in order to manipulate the second object through rotation of the first object, the second object may be immediately manipulated without displaying the AR image, and the AR image may be displayed near the second object or may be displayed to overlap an image of the second object. In a state in which the AR image is displayed near the second object, the second object may be considered a manipulation target.

As such, according to one or more embodiments, when the user attempts to change a currently-watched channel of the TV (second object) by rotating the pen (first object) the user holds in hand, a channel of the TV (second object) may be immediately changed without displaying of an AR image, and a virtual image of a UI corresponding to a channel change operation may be displayed near the TV (second object).

According to one or more embodiments, the user using the AR device in the wearable form may take notes (or, draw a painting) on a tablet PC (or, a mobile phone) connected to the AR device by using a stylus pen. When the AR device performs an operation of transmitting an instruction to change a type of the pen in writing to the connected tablet PC based on an identified grip position and rotation, the AR device may display a virtual image of a UI corresponding to the operation and thus provide the UI to the user. The AR device may display a virtual image of an image of list about "pen type" and an indicator indicating a current type around the stylus pen based on the grip position, and may display a virtual image of an indicator indicating a type to be changed based on a rotation degree or a rotation angle. For example, when the current type is "Eyedropper", the AR device may change a type to "Brush", "Eraser", "Gradient", "Fill", or "Stamp", based on the rotation degree or the rotation angle, with respect to an operation of rotating, by the user, the first object.

According to one or more embodiments, the user using the AR device in the wearable form may take notes (or, draw a painting) on a tablet PC (or, a mobile phone) connected to the AR device by using a stylus pen the user holds in hand. For example, when the AR device performs an operation of transmitting an instruction to change a type of the pen in writing to the connected tablet PC, based on an identified grip position and rotation, the AR device may display a virtual image of a UI corresponding to the operation and thus provide the UI to the user. For example, the AR device may display a virtual image of a spectrum image about "pen thickness" and an indicator indicating a current thickness around the stylus pen, based on the grip position, and may display a virtual image of an indicator indicating a thickness to be changed, based on a rotation degree or a rotation angle. For example, when the current pen thickness is "20", the AR device may increase or decrease a thickness, based on the rotation degree or the rotation angle, with respect to an operation of rotating, by the user, the first object. According to one or more embodiments, when the user rotates the first object in a clockwise direction, the pen thickness may increase, and when the user rotates the first object in a counterclockwise direction, the pen thickness may decrease. An increase and decrease in the rotation direction and the pen thickness may be performed in opposite to one or more embodiments. According to one or more embodiments, whenever the user rotates the stylus pen by a preset angle, the pen thickness may increase or decrease by 1. For example, in a case where it is set that the pen thickness increases or decreases by 1 at every rotation of the pen by 10°, when the user rotates the stylus pen by 10° in a clockwise direction, the pen thickness may increase by 1, and when the user rotates the stylus pen by 10° in a counterclockwise direction, the pen thickness may decrease by 1.

According to one or more embodiments, the user using the AR device in the wearable form may control a tablet PC (or, a mobile phone) connected to the AR device by using a stylus pen the user holds in hand. When the AR device performs an operation of transmitting an instruction to switch an execution screen of an application executed in the tablet PC to the connected tablet PC based on an identified grip position and rotation, the AR device may display a virtual image of a UI corresponding to the operation and thus provide the UI to the user. The AR device may display a virtual image of an icon of a type of the application executed in the tablet PC around the stylus pen, based on the grip position, and may display a virtual image of an indicator indicating a target application to be screen-switched, based on a rotation degree or a rotation angle. The AR device may change the target application to be screen-switched, based on the rotation degree or the rotation angle, with respect to an operation of rotating, by the user, the first object.

Figure 7:
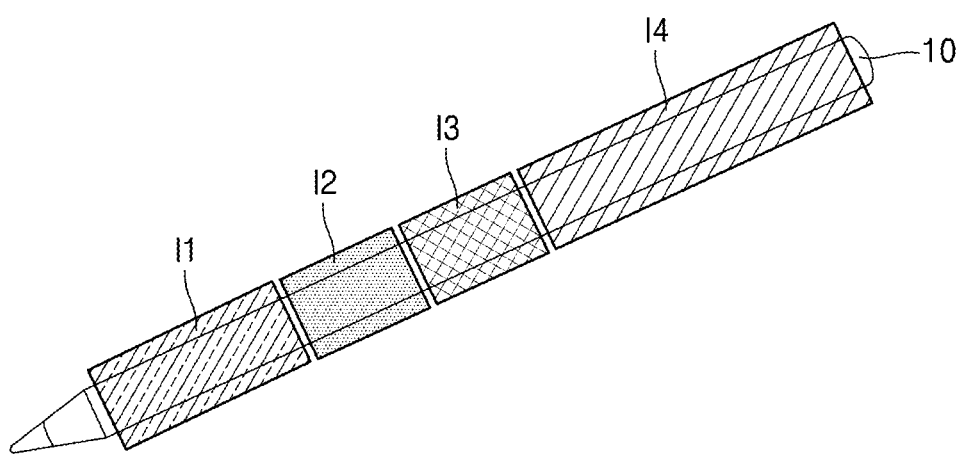
FIG. 7 is a diagram illustrating an AR device providing a user with a guide to a grip position according one or more embodiments.

FIG. 7 is a diagram illustrating the AR device providing a user with a guide to a grip position according to one or more embodiments.

According to one or more embodiments, the AR device may provide indicators I1, I2, I3, and I4 to the user with a guide to operation types respectively corresponding to grip positions through a virtual image. Indicators I1, I2, I3, and I4 may be provided in the UI on the first object 10 and guide the user with operation corresponding to each part on the first object 10. The user may control the AR device based on the indicators I1, I2, I3, and I4.

According to one or more embodiments, the AR device may provide, through the virtual image, the user with the guide to preset sections as the indicators I1, I2, I3, and I4. It may be difficult for the user to identify a boundary between two adjacent sections. The user may not identify which position on the first object 10 is the first section I1, and may incorrectly grip a particular position in the second section I2 although the user intends to grip the first section I1. In this case, as the user grips an incorrect position although the user intends a first operation (e.g., a change in a type of a pen in writing), a second operation (e.g., a change in a color of the pen in writing) may be performed.

In order to prevent a grip position error, the AR device may provide the user with the guide (I1, I2, I3, and I4) to respective distinguished sections. According to one or more embodiments, the AR device may provide a virtual image of a marking line marking a boundary between two sections, or may display respective sections with frames, different colors or hatches. As the guide (i.e. indicators I1, I2, I3, and I4) that distinguishes between different areas on the first object 10 is provided as the virtual image to the user, the user may be guided to grip a correct position.

The guide provided to the user is not limited thereto, and the AR device may provide the user with information about a grip position through various methods.

Referring to FIG. 7, according to one or more embodiments, an instruction corresponding to an operation of rotating a first object may be divided into four grip positions. The AR device may indicate grip positions respectively corresponding to instructions with different colors and may provide the guide to the user. According to one or more embodiments, an indicator indicating which operation corresponds to each of the areas may be further included in the virtual image.

Figure 8:
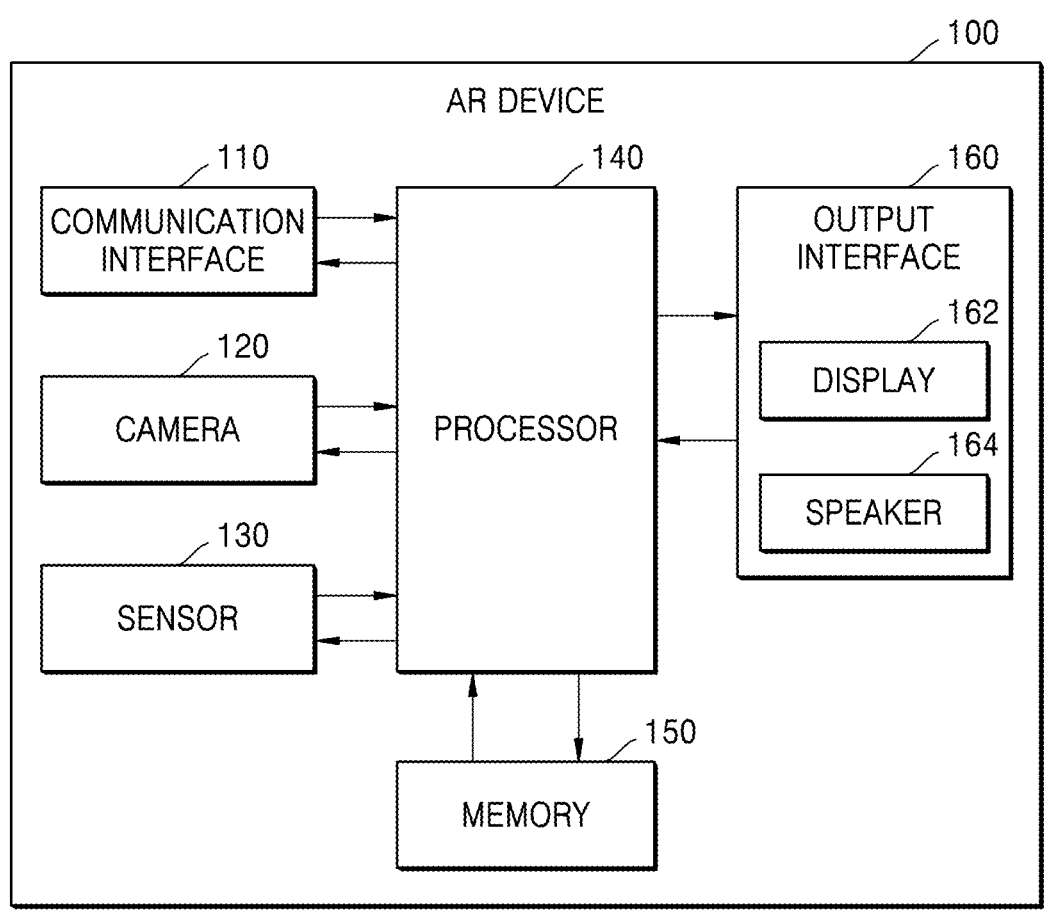
FIG. 8 is a block diagram of an AR device according to one or more embodiments.

FIG. 8 is a block diagram of an AR device 100 according to one or more embodiments.

Referring to FIG. 8, the AR device 100 may include a communication interface 110, a camera 120, a sensor 130, a processor 140, a memory 150, and an output interface 160. The communication interface 110, the camera 120, the sensor 130, the processor 140, the memory 150, and the output interface 160 may be connected to each other in an electrical and/or physical manner. However, elements of the AR device 100 are not limited to what is shown in FIG. 8. The AR device 100 may include more elements than the shown elements of FIG. 8 or may include fewer elements than the shown elements of FIG. 8.

According to one or more embodiments, the AR device 100 may be implemented as AR glasses to be worn on a head of a user, and in this case, the AR device 100 may further include a power supply (e.g., a battery) configured to supply driving power to the communication interface 110, the camera 120, the sensor 130, the processor 140, and the output interface 160. According to one or more embodiments, the AR device 100 may not include a speaker 164.

The communication interface 110 may be configured to transmit and receive data to and from a server or an external device (e.g., a device of interest) via a wired or wireless communication network. The communication interface 110 may perform data communication with the server or the external device by using at least one of data communication methods including wired local area network (LAN), wireless LAN, Wi-Fi, Bluetooth, ZigBee, Wi-Fi direct (WFD), infrared data association (IrDA), Bluetooth low energy (BLE), Near Field Communication (NFC), wireless broadband Internet (WiBro), World interoperability for microwave access (WiMAX), shared wireless access protocol (SWAP), wireless gigabit alliance (WiGig), and radio frequency (RF) communication. However, the disclosure is not limited thereto, and thus, when the AR device 100 is implemented as a wearable device such as smart glasses, the communication interface 110 may transmit and receive data to and from the server or the external device via a network that conforms to the mobile communication standard such as code-division multiple access (CDMA), wideband CDMA (WCDMA), $3^{rd}$-generation (3G), $4^{th}$-generation (4G) (long term evolution (LTE)), $5^{th}$-generation (5G) Sub 6, and/or a communication scheme using millimeter wave (mmWave).

According to one or more embodiments, the communication interface 110 may receive auxiliary sensing information from a first object or may transmit an instruction to a second object to be manipulated, according to control by the processor 140. The communication interface 110 may provide the received sensing information of the first object to the processor 140.

According to one or more embodiments, the communication interface 110 may be connected to at least one external object via a short-range communication scheme including Bluetooth, WiFi direct, or the like, and may transmit and receive various information to and from the external object.

The camera 120 may be configured to obtain two-dimensional (2D) image data by photographing a real-world space. The camera 120 may be embedded in the AR device 100, may be implemented as a small form factor, and may be a lightweight RGB camera configured to consume small power. However, the disclosure is not limited thereto, and according to one or more embodiments, the camera 120 may be implemented as all known cameras including an RGB-depth camera including a depth estimation function, a dynamic vision sensor camera, a stereo fisheye camera, a grayscale camera, an infrared camera, or the like. According to one or more embodiments, at least some of the camera 120 may be arranged to face a user, and may be configured to photograph a face of the user.

The camera 120 may include a lens module, an image sensor, and an image processing module. The camera 120 may obtain a still image or a video about a real-world scene by using the image sensor (e.g., a complementary metal-oxide-semiconductor (CMOS) or a charge-coupled device (CCD)). The video may include a plurality of image frames which are obtained in real time as a real-world area is photographed via the camera 120. The image processing module may encode a still image configured of a single image frame obtained via the image sensor or video data configured of a plurality of image frames, and may transfer an encoding result to the processor 140.

According to one or more embodiments, photographing of a real-world scene image may include an operation of the AR device 100 to obtain an image by converting an optical image into an electrical signal, the optical image being formed via a lens by controlling the camera 120 (e.g., a camera including an image sensor and a lens). According to one or more embodiments, one or more processors 140 may obtain an image (e.g., a captured image) including one or more frames by photographing surrounding of the AR device 100 by controlling the camera 120 arranged at the AR device 100. Here, the image may include a live-view image.

The sensor 130 may include sensors configured to detect a real-world space, a position, a situation, or user information. According to one or more embodiments, the sensor 130 may include an eye-tracking sensor, an inertial measurement unit (IMU) sensor, a global positioning system (GPS) sensor, a Bluetooth Low Energy (BLE) sensor, a ultra wide broadband (UWB) or a sensor capable of sensing various signals, but the disclosure is not limited thereto.

The processor 140 may execute one or more instructions of a program stored in the memory 150. The processor 140 may include hardware elements for performing arithmetic, logic, and input/output computations and image processing. While FIG. 8 illustrates one processor 140, the disclosure is not limited thereto, and the processor 140 may refer to one or more processors. The processor 140 may be a general-purpose processor such as a CPU, an AP, a DSP, or the like, a graphics-dedicated processor such as a GPU, a VPU or the like, or an AI-dedicated processor such as a NPU. The processor 140 may control input data to be processed according to a predefined operation rule or an AI model. Alternatively, when the processor 140 is an AI-dedicated processor, the AI-dedicated processor may be designed to have a hardware structure specialized for processing of a particular AI model.

The memory 150 may be configured as a storage medium of at least one type of a flash memory type, a hard disk type, a multimedia card micro type, a card type memory (such as, a secure digital (SD) or an extreme digital (XD) memory), a random access memory (RAM), a static RAM (SRAM), a read-only memory (ROM), an electrically erasable programmable ROM (EEPROM), a programmable ROM (PROM), or an optical disk.

The memory 150 may store instructions related to a function and/or an operation for the AR device 100 to operate. According to one or more embodiments, the memory 150 may store at least one of instructions, algorithm, data structure, program code, or application program, which is readable by the processor 140. The instructions, the algorithm, the data structure, and the program code stored in the memory 150 may be implemented in, for example, programming or scripting languages such as C, C++, Java, assembler, etc.

The processor 140 may execute instructions or program codes stored in the memory 150, and may control all operations of the AR device 100. The processor 140 may perform operations according to one or more embodiments.

According to one or more embodiments, the processor 140 may generally control the communication interface 110, the camera 120, the sensor 130, and the output interface 160, by executing programs stored in the memory 150.

The processor 140 may include hardware elements for performing arithmetic, logic, and input/output computations and signal processing. The processor 140 may include at least one of a CPU, a microprocessor, a graphic processor (GPU), application specific integrated circuits (ASICs), DSPs, digital signal processing devices (DSPDs), programmable logic devices (PLDs), or field programmable gate arrays (FPGAs), but the disclosure is not limited thereto.

According to one or more embodiments, the processor 140 may be configured to execute one or more instructions stored in the memory 150 to obtain a real-world scene image through the camera 120, identify a first object from the obtained image, identify a grip position at which a user grips the first object, and perform a corresponding operation based on the identified grip position.

The output interface 160 may be configured to be controlled by the processor 140 so as to output a UI as an AR image (virtual image), the UI corresponding to the operation performed by the AR device 100, or to output a sound signal. The output interface 160 may include a display 162 and the speaker 164.

The display 162 may include at least one of a liquid crystal display, a thin film transistor-liquid crystal display, an organic light-emitting diode display, a flexible display, a three-dimensional (3D) display, an electrophoretic display, or a laser display.

According to one or more embodiments, when the AR device 100 is configured as AR glasses, the display 162 may be a lens optical system, and may include a waveguide and an optical engine. The optical engine may be configured as a projector to generate light of an AR image including a text, an icon, a virtual image, or the like and project the light to the waveguide. The optical engine may include an image panel, an illumination optical system, a projection optical system, etc. According to one or more embodiments, the optical engine may be arranged in a frame or temple of the AR glasses.

The speaker 164 may be configured to output a sound signal. According to one or more embodiments, the speaker 164 may output a voice message or a notification sound according to control by the processor 140.

Figure 9:
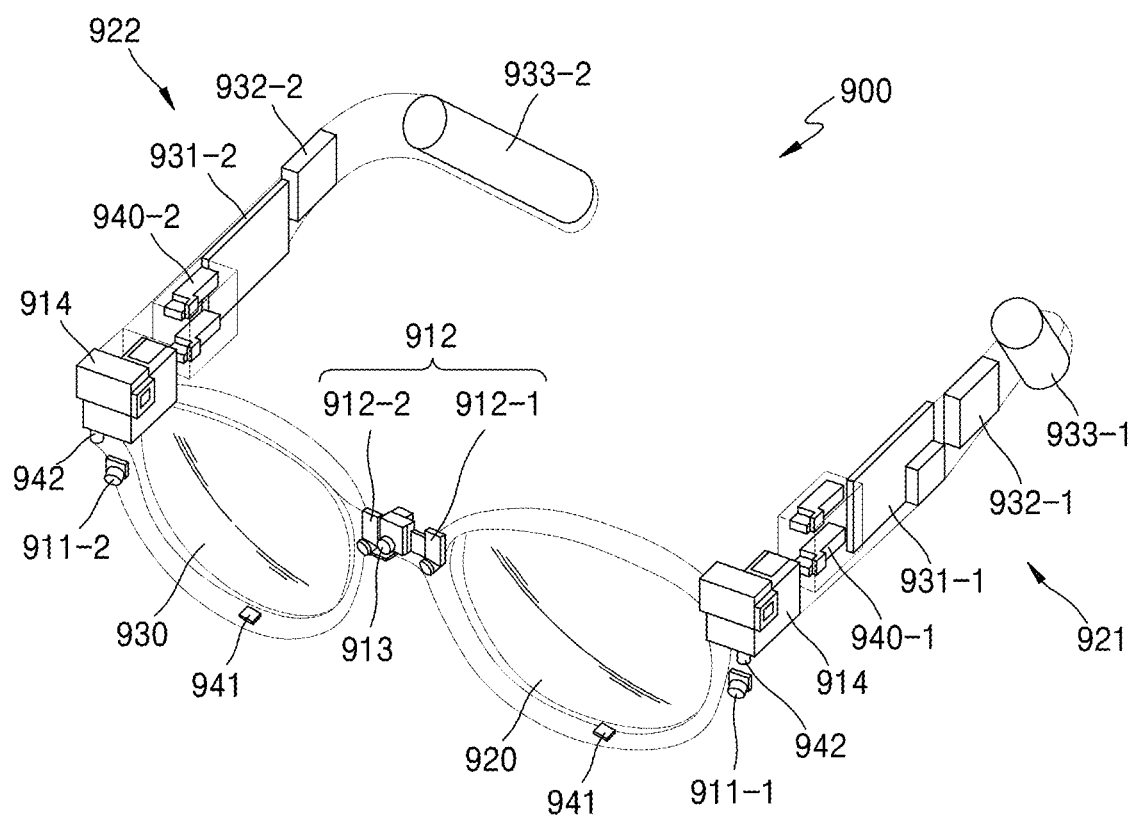
FIG. 9 is a diagram of an AR device of a glasses type one or more embodiments.

FIG. 9 is a diagram of an AR device 900 of a glasses type according to one or more embodiments.

Referring to FIG. 9, the AR device 900 may be capable of displaying information about a device of interest through which an AR image is shown. The AR device 900 may be a device capable of providing an AR-related service, and may include AR glasses in the form of eye glasses to be worn by a user on a face, a HMD, a virtual reality headset (VRH) or an ARH to be worn on the head, etc. In a case of a head-mounted type device, as a display is arranged in front of eyes of a user, an ultra-large screen may be provided to the user, and the screen may move as the user moves such that a realistic virtual world may be provided.

According to one or more embodiments, the user may wear the AR device 900 capable of displaying visual AR content. The AR device 900 may include an audio module configured to provide the user with audio AR content. According to one or more embodiments, the AR device 900 may include one or more cameras capable of capture an image and a video of a surrounding environment. The AR device 900 may include an eye tracking system to determine a vergence distance of the user. According to one or more embodiments, the AR device 900 may include a lightweight HMD (e.g., goggles, glasses, a visor, etc.). According to one or more embodiments, the AR device 900 may include a device such as a lightweight portable display device or one or more laser projection glasses (glasses capable of projecting low-powered laser onto retinas of the user so as to project and display an image or depth content to the user).

According to one or more embodiments, the AR device 900 may provide an AR service that outputs one or more virtual objects to be overlapping on an area determined to be a field of view (FOV) of the user. According to one or more embodiments, the area determined to be the FOV of the user may be an area determined that the user using the AR device 900 can recognize content through the AR device 900, and may be the area including an entire display or at least a part of the display of the AR device 900. According to one or more embodiments, the AR device 900 may include transparent members 920 and 930 respectively corresponding to both eyes of the user.

According to one or more embodiments, the AR device 900 may include a display module 914, a camera, an audio output unit, and supporting units 921 and 922.

The camera may capture an image corresponding to the FOV of the user or may measure a distance to an object. The camera may correspond to the camera 120 of FIG. 8. According to one or more embodiments, the camera may be used to perform head tracking and space recognition. Also, the camera may recognize movement of the user.

According to one or more embodiments, the camera may further include an eye tracking (ET) camera 912, in addition to a camera 913 used to obtain an image corresponding to the FOV of the user (i.e. a real-world scene image), detect an object, or perform space recognition. According to one or more embodiments, the ET camera 912 may be used to detect and track eyes of the user. The ET camera 912 may be used to adjust a center of a virtual image projected onto the AR device 900 to be positioned according to a direction in which eyes of the user worn the AR device 900 gazes. According to one or more embodiments, the ET camera 912 may include a global shutter (GS) camera to detect pupils and track movement of the pupils without a delay. The ET camera 912 may separately include a left-eye camera 912-1 and a right-eye camera 912-2.

According to one or more embodiments, the display module 914 may include a first display 930 and a second display 920. The display module 914 may correspond to the display 162 of FIG. 8 described above. A virtual object output through the display module 914 may include information related to an application program executed in the AR device 900, information about a device of interest, or information related to an external object positioned in a real-world space corresponding to an area determined to be an FOV of a user. According to one or more embodiments, the AR device 900 may identify the external object included in at least a part corresponding to the area determined to be the FOV of the user from image information related to the real-world space which is obtained through the camera 913. The AR device 900 may output a virtual object related to the external object identified from at least the part through the area determined to be the FOV of the user from among a display area of the AR device 900. The external object may include an object existing in the real-world space.

According to one or more embodiments, the displays 920 and 930 may each be a transparent member including a light-focusing lens or a waveguide. According to one or more embodiments, the transparent member may include a glass plate, a plastic plate, or polymer, and may be manufactured to be completely transparent or translucent. According to one or more embodiments, the transparent member may include the first transparent member 930 facing a right eye of the user worn the AR device 900 and the second transparent member 920 facing a left eye of the user. When the first display 930 and the second display 920 are transparent, the displays may be arranged at a position facing eyes of the user so as to display a screen.

Light generated in a light source of the display may be transmitted to eyes of the user through the waveguide. The waveguide may be partially positioned at a part of the transparent members 920 and 930. According to one or more embodiments, light emitted from the displays may be incident on an end of the waveguide, and the incident light may be transmitted to eyes of the user through internal total reflection in the waveguide. The waveguide may be manufactured from a transparent material such as glass, plastic, or polymer, and may include a nanopattern formed on an inner or outer surface, such as a polygonal or curved grating structure. According to one or more embodiments, the incident light may be propagated or reflected inside the waveguide by the nanopattern and provided to the eyes of the user. According to one or more embodiments, the waveguide may include at least one of at least one diffractive element (e.g., a diffractive optical element (DOE), a holographic optical element (HOE)) or a reflective element (e.g., a mirror). According to one or more embodiments, display light emitted from the light source unit may be guided to eyes of the user through the waveguide using the at least one diffractive element or the reflective element.

According to one or more embodiments, the displays 920 and 930 may each include a display panel or a lens (e.g., glass). The display panel may include a transparent material such as glass or plastic. According to one or more embodiments, the display may be configured as a transparent device, and the user may recognize a real-world space at the rear of the display through the display. The display may display a virtual object on at least a part of the transparent device so as to allow the virtual object to be seen as if the virtual object is added onto at least the part of the real-world space.

According to one or more embodiments, the supporting units 921 and 922 may include respectively printed circuit boards (PCBs) 931-1 and 931-2 configured to transmit electrical signals to each element of the AR device 900, speakers 932-1 and 932-2 configured to output audio signals or batteries 933-1 and 933-2 configured to supply power. The speakers 932-1 and 932-2 may be configured to output audio signals and may correspond to the speaker 164 of FIG. 8. In the AR device 900 of a glasses type, the supporting units 921 and 922 may be arranged at temples of the user. The supporting units 921 and 922 may include hinges 940-1 and 940-2 to be combined with a body of the AR device 900. The speakers 932-1 and 932-2 may include the first speaker 932-1 configured to deliver an audio signal to a left ear of the user, and the right speaker 932-2 configured to deliver an audio signal to a right ear of the user.

Referring to FIG. 9, the AR device 900 may include microphones 941 to receive a voice of a user and surrounding sound. Also, the AR device 900 may include at least one illumination LED 942 to increase accuracy of at least one camera (e.g., the ET camera 912, an outward-facing camera 913, or recognition cameras 911-1 and 911-2). The illumination LED 942 may be used as an auxiliary means to increase accuracy when photographing a user's pupil with the ET camera 912, and may use an infra-red LED of an infrared wavelength rather than a visible light wavelength.

According to one or more embodiments, the illumination LED 942 may be used as an auxiliary means when it is not easy to detect a subject due to a dark environment when photographing a user's gesture by using the recognition cameras 911-1 and 911-2.

According to one or more embodiments, the display module 914 may include a first light guide plate (e.g., the first display 930) corresponding to a right eye and a second light guide plate (e.g., the second display 920) corresponding to a left eye, and may provide visual information to the user through the first light guide plate 930 and the second light guide plate 920. According to one or more embodiments, the display module 914 may include a display panel and a lens (e.g., a glass lens, an LC lens). The display panel may include a transparent material such as glass or plastic.

According to one or more embodiments, the display module 914 may be configured as a transparent device, and the user may recognize a real-world space in front of the user and in the rear of the display module 914 through the display module 914. The display module 914 may display a virtual object on at least a part of the transparent device so as to allow the virtual object to be seen as if the virtual object is added onto at least the part of the real-world space.

According to one or more embodiments, the AR device 900 may determine an external object included in at least a part corresponding to an area determined as the FOV of the user among image information related to the real-world space obtained through the outward-facing camera 913. The AR device 900 may output (or display) a virtual object related to the external object identified in the at least part through an area determined as the FOV of the user from among display areas of the AR device 93300. The external object may include an object or thing existing in the real-world space. According to one or more embodiments, the display area on which the AR device 900 displays the virtual object may include a part of the display module 914 (e.g., at least a part of the display panel). According to one or more embodiments, the display area may be an area corresponding to at least a part of the first waveguide 930 and the second waveguide 920.

According to one or more embodiments, the AR device 900 may measure a distance to a physical object positioned in a front direction of the AR device 900 by using the outward-facing camera 913. The outward-facing camera 913 may include high definition cameras such as a high resolution (HR) camera and a photo video (PV) camera.

The AR device 900 according to one or more embodiments is not limited to elements described above, and thus may include various number of elements at various positions.

According to one or more embodiments, a method for operating an augmented reality (AR) device based on an image of a first object, the image being obtained through a camera, the method includes identifying the first object from the image, identifying a grip position at which a user grips the first object, and performing an operation based on the identified grip position. By doing so, an interaction with respect to the first object such as a digitizer pen, etc. may be performed in an AR environment. In one or more embodiments, a scheme of providing a user with information in an AR environment is not limited to a two-dimensional display, and related information may be displayed near an object by using object information in a real-world space, and an area usable by a user is not limited to be on a display of a particular electronic device.

According to one or more embodiments, identifying of the grip position may include detecting at least one feature point from the image, identifying a hand of the user based on the detected at least one feature point, and determining the grip position based on a position of the hand of the user and a position of the first object.

According to one or more embodiments, a lengthwise area of the first object may be divided into sections that respectively correspond to different operations of the AR device, the sections may represent a percentage of area of the lengthwise area of the first object.

According to one or more embodiments, the first object may be divided into preset sections that respectively correspond to different operations of the AR device.

According to one or more embodiments, the method may further include providing the user, via a virtual image, with a guide comprising a plurality of operations corresponding to different grip positions.

According to one or more embodiments, in a state in which an area at which the user contacts the first object corresponds to a plurality of contact areas, the identifying of the grip position may include identifying a contact area having a highest priority from among the plurality of contact areas, and determining the grip position based on the contact area having the highest priority.

According to one or more embodiments, the method may further include identifying a rotation of the first object. The performing of the corresponding operation may include performing the corresponding operation based on the identified grip position and the identified rotation of the first object.

According to one or more embodiments, the identifying of the rotation of the first object may include identifying a first time point at which the rotation of the first object starts, calculating an accumulated amount of movement from the first time point up to a second time point, the second time point being a time point at a time of the calculation of the accumulated amount of movement, and determining the rotation based on the accumulated amount of movement.

According to one or more embodiments, the first time point may be an earliest time point from among consecutive time points at which an amount of movement during a period of time is equal to or greater than a preset threshold.

According to one or more embodiments, the first object may include a touch sensor, a rotation sensing sensor, or a touch sensor and a rotation sensor, and the identifying of the rotation of the first object may include obtaining sensing information from the first object via the touch sensor, the rotation sensing sensor, or the touch sensor and the rotation sensor, and determining the rotation based on the obtained sensing information.

According to one or more embodiments, the method may further include displaying a UI corresponding to the operation being performed.

According to one or more embodiments, provided is an AR device which may include a camera configured to obtain a real-world scene image; a display; a memory storing a program including at least one instruction; and at least one processor configured to identify a first object from the real-world scene image, identify a grip position at which a user grips the first object, and perform an operation based on the identified grip position.

According to one or more embodiments, the at least one processor may be further configured to detect at least one feature point from the real-world scene image, identify a hand of the user based on the detected at least one feature point, and determine the grip position based on a position of the hand of the user and a position of the first object.

According to one or more embodiments, a lengthwise area of the first object may be divided into sections that respectively correspond to different operations of the AR device, the sections may represent a percentage of area of the lengthwise area of the first object.

According to one or more embodiments, the first object may be divided into preset sections that respectively correspond to different operations of the AR device.

According to one or more embodiments, the at least one processor may be further configured to provide the user, via a virtual image, with a guide comprising a plurality of operations respectively corresponding to different grip positions.

According to one or more embodiments, the at least one processor may be further configured to, in a state in which an area at which the user contacts the first object corresponds to a plurality of contact areas, identify a contact area having a highest priority from among the plurality of contact areas, and determine the grip position based on the contact area having the highest priority.

According to one or more embodiments, the at least one processor may be further configured to identify a rotation of the first object, and perform the corresponding operation based on the identified grip position and the identified rotation of the first object.

According to one or more embodiments, the at least one processor may be further configured to identify a first time point at which the rotation of the first object starts, calculate an accumulated amount of movement from the first time point up to a second time point, the second time point being a time point at a time of the calculation of the accumulated amount of movement, and determine the rotation based on the accumulated amount of movement.

According to one or more embodiments, the at least one processor may be further configured to determine the first time point as an earliest time point from among consecutive time points at which an amount of movement during a period of time is equal to or greater than a preset threshold.

According to one or more embodiments, the first object may include a touch sensor, a rotation sensing sensor, or a touch sensor and a rotation sensor, and the at least one processor may be further configured to obtain sensing information from the first object via the touch sensor, the rotation sensing sensor, or the touch sensor and the rotation sensor, and determine the rotation based on the obtained sensing information.

According to one or more embodiments, a computer program product may include a computer-readable recoding medium. The computer-readable recording medium may store instructions readable by the AR device so as to cause the AR device to perform at least one embodiment of the method.

In this manner, according to one or more embodiments, a user may further easily and conveniently control the AR device or an electronic device connected to the AR device.

According to one or more embodiments, an intuitive interaction in which movements of hands and arms are minimized may be provided to the user so as to allow the user not to perform unnecessary movement several times when the user uses a digitizer pen in an AR environment. Accordingly, user convenience may be increased. Also, functions of a toolbar may be provided at a current position of a hand without making the user touch the toolbar displayed on a two-dimensional screen of an electronic device. Accordingly, user convenience may be increased.

According to one or more embodiments, when the user using the AR device edits or manipulates content such as a document, an image, etc., the user may intuitively execute a function by manipulating an object (a pen, a bar, etc.) in various forms without entering a complicated UI related to menus. The executing of the function may be performed based on at least one of a position at which the user grips the object, the user moves the object, or the user moves their hand.

Various embodiments of the disclosure may be implemented or supported by one or more computer programs, and the computer programs may be formed of computer-readable program codes and may be embodied on a computer-readable medium. In the disclosure, the terms "application" and "program" may refer to one or more computer programs, software components, instruction sets, procedures, functions, objects, classes, instances, associated data, or part thereof, which are appropriately implemented in computer-readable program codes. The "computer-readable program codes" may include various types of computer codes including source codes, target codes and executable codes. The "computer-readable medium" may include various types of medium accessible by a computer, such as a ROM, RAM, a hard disk drive (HDD), a compact disc (CD), a digital versatile disc (DVD) or other various types of memory.

Also, the computer-readable storage medium may be provided in the form of a non-transitory storage medium. Here, the term 'non-transitory storage medium' means that the storage medium is a tangible entity and may exclude wired, wireless, optical, or other communication links via which temporary electrical or other signals are transmitted. The 'non-transitory storage medium' does not distinguish that data is stored semi-permanently or temporarily on the storage medium. The non-transitory storage medium may include a buffer in which data is temporarily stored. The computer-readable medium may include any usable medium that may be accessed by computers, volatile and non-volatile mediums, and detachable and non-detachable mediums. The computer-readable medium includes a medium for permanently storing data, and a medium for storing data which can be overwritten afterward, such as a rewritable optical disk or an erasable memory device.

The disclosed embodiments may be implemented in a software (S/W) program including instructions stored in a computer-readable storage medium. The computer is a device capable of calling the stored instructions from the storage medium and operating according to the disclosed embodiments in accordance with the called instructions, and may include an electronic device according to the disclosed embodiments.

According to one or more embodiments, a method according to various embodiments disclosed in the disclosure may be provided in a computer program product. The computer program product may include an S/W program and a computer-readable storage medium having stored thereon the S/W program. The computer program product may include a product (e.g. a downloadable application) in a S/W program distributed electronically through a manufacturer of an electronic device or an electronic market. For electronic distribution, at least a part of the S/W program may be stored on the storage medium or may be generated temporarily. In this case, the storage medium may be a storage medium of a server of the manufacturer, a server of the electronic market, or a relay server for temporarily storing the S/W program.

The computer program product may include a storage medium of a server or a storage medium of a device, in a system including the server and the device. Alternatively, when there is a third device (e.g., a smartphone) that communicates with the server or the device, the computer program product may include a storage medium of the third device. Alternatively, the computer program product may include a S/W program that is transmitted from the server to the device or the third device or from the third device to the device.

In this case, one of the server, the device, and the third device may perform the method according to the one or more embodiments of the disclosure by executing the computer program product. Alternatively, at least two of the server, the device, and the third device may divide and perform, by executing the computer program product, the method according to the disclosed one or more embodiments.

The server (e.g., a cloud server, an AI server, or the like) may execute the computer program product stored in the server, thereby controlling the device to perform the method according to the disclosed one or more embodiments, and the device may communicate with the server.

The third device may execute the computer program product, thereby controlling the device to perform the method according to the disclosed one or more embodiments, and the device may communicate with the third device. When the third device executes the computer program product, the third device may download the computer program product from the server, and may execute the downloaded computer program product. Alternatively, the third device may perform the method according to the disclosed one or more embodiments by executing a preloaded computer program product.

Although certain example embodiments are illustrated and described above, the present disclosure is not limited to said certain embodiments, various applications may of course be performed by those skilled in the art without deviating from what is claimed in the scope of claims, and such applications should not be understood separately from the technical idea or prospects herein.

What is claimed is:

1. A method of operating an augmented reality (AR) device, the method comprising:
   identifying a first object from an image of the first object obtained through a camera;
   identifying a grip position at which a user grips the first object;
   identifying a rotation of the first object; and
   performing an operation based on the grip position and the rotation of the first object.

2. The method of claim 1, wherein the identifying the grip position comprises:
   identifying at least one feature point from the image;
   identifying a hand of the user based on the at least one feature point; and
   identifying the grip position based on a position of the hand of the user and a position of the first object.

3. The method of claim 1, wherein a lengthwise area of the first object is divided into sections that respectively correspond to different operations of the AR device, and the sections represent a percentage of area of the lengthwise area of the first object.

4. The method of claim 1, wherein the first object is divided into sections that respectively correspond to different operations of the AR device.

5. The method of claim 1, further comprising providing the user with a virtual image of a guide to operation types respectively corresponding to different grip positions.

6. The method of claim 1, further comprising:
in case that the user contacts the first object at a plurality of contact areas, identifying a priority of each of the plurality of contact areas based on a preset rule; and
determining the grip position as a contact area having a highest priority.

7. The method of claim 1, wherein the identifying the rotation of the first object comprises:
identifying a first time point at which the rotation of the first object starts;
determining an accumulated amount of movement from the first time point up to a current time point; and
determining the rotation based on the accumulated amount of movement.

8. The method of claim 7, wherein the first time point is an earliest time point from among consecutive time points at which an amount of movement during a period of time is equal to or greater than a preset threshold.

9. The method of claim 1, wherein the first object comprises at least one of a touch sensor or a rotation sensing sensor, and
wherein the identifying the rotation of the first object comprises:
obtaining sensing information from the first object via the at least one of the touch sensor or the rotation sensing sensor; and
determining the rotation based on the obtained sensing information.

10. The method of claim 1, further comprising displaying a user interface (UI) corresponding to the operation being performed.

11. An augmented reality (AR) device comprising:
a camera configured to obtain an image;
a display;
a memory storing at least one program comprising at least one instruction; and
at least one processor configured to execute the at least one instruction to:
identify a first object from the image;
identify a grip position at which a user grips the first object;
identify a rotation of the first object; and
perform an operation based on the grip position and the rotation of the first object.

12. The AR device of claim 11, wherein the at least one processor is further configured to execute the at least one instruction to:
identify at least one feature point from the image;
identify a hand of the user based on the detected at least one feature point; and
identify the grip position based on a position of the hand of the user and a position of the first object.

13. The AR device of claim 11, wherein the at least one processor is further configured to execute the at least one instruction to:
in a case that the user contacts the first object at a plurality of contact areas, identify priority of each of the plurality of contact areas based on a preset rule; and
determine the grip position as a contact area having a highest priority.

* * * * *